(12) United States Patent
Sandorfi et al.

(10) Patent No.: US 8,620,640 B2
(45) Date of Patent: Dec. 31, 2013

(54) EMULATED STORAGE SYSTEM

(75) Inventors: Miklos Sandorfi, Northborough, MA (US); Timmie G. Reiter, Westborough, MA (US)

(73) Assignee: Sepaton, Inc., Marlborough, MA (US)

( * ) Notice: Subject to any disclaimer, the term of this patent is extended or adjusted under 35 U.S.C. 154(b) by 1140 days.

(21) Appl. No.: 11/859,088

(22) Filed: Sep. 21, 2007

(65) Prior Publication Data

US 2008/0082310 A1 Apr. 3, 2008

Related U.S. Application Data

(60) Division of application No. 11/016,370, filed on Dec. 17, 2004, now abandoned, which is a continuation-in-part of application No. 10/954,623, filed on Sep. 30, 2004, now abandoned, which is a continuation-in-part of application No. 10/911,987, filed on Aug. 5, 2004, now Pat. No. 7,146,476.

(60) Provisional application No. 60/507,329, filed on Sep. 30, 2003, provisional application No. 60/492,827, filed on Aug. 6, 2003, provisional application No. 60/492,576, filed on Aug. 5, 2003.

(51) Int. Cl.
*G06F 9/455* (2006.01)
*G06F 7/00* (2006.01)
*G06F 17/00* (2006.01)
*G06F 13/00* (2006.01)
*G06F 13/28* (2006.01)

(52) U.S. Cl.
USPC ............. 703/23; 707/609; 711/111; 711/112; 711/113

(58) Field of Classification Search
USPC .................. 703/23; 707/609; 711/111–113
See application file for complete search history.

(56) References Cited

U.S. PATENT DOCUMENTS 5,226,141 A * 7/1993 Esbensen ............... 711/171
5,239,659 A * 8/1993 Rudeseal et al. ............ 714/6

(Continued)

FOREIGN PATENT DOCUMENTS

EP 0774715 A 5/1997
EP 774715 A1 * 5/1997 ............. G06F 11/14

(Continued)

OTHER PUBLICATIONS

Time Navigator—Backup, archiving and restoration software Nov. 10, 2000, http://www.icewalkers.com/Linux/Software/512830/Time-Navigator.html (retrieved Oct. 20, 2009)—printed Dec. 16, 2009.

(Continued)

*Primary Examiner* — Omar Fernandez Rivas
*Assistant Examiner* — Angel Calle
(74) *Attorney, Agent, or Firm* — Lando & Anastasi, LLP

(57) ABSTRACT

A back-up storage system that emulates a sequential storage medium such as a tape and stores data on a randomly accessible storage medium, such as disk. The back-up storage system includes a randomly accessible storage medium, a front-end interface to emulate the sequential storage medium, to communicate with external devices using a protocol that supports the sequential storage medium, and to receive sequential-format data from the external devices, and a back-end interface to receive the sequential-format data from the front-end interface and to store the sequential-format data on the randomly-accessible storage medium.

8 Claims, 21 Drawing Sheets

(56) References Cited

U.S. PATENT DOCUMENTS

| | | | |
|---|---|---|---|
| 5,276,860 A | 1/1994 | Fortier et al. | |
| 5,403,639 A * | 4/1995 | Belsan et al. | 1/1 |
| 5,454,098 A | 9/1995 | Pisello et al. | |
| 5,991,862 A * | 11/1999 | Ruane | 711/202 |
| 6,070,224 A * | 5/2000 | LeCrone et al. | 711/112 |
| 6,230,190 B1 | 5/2001 | Edmonds et al. | |
| 6,247,024 B1 * | 6/2001 | Kincaid | 707/204 |
| 6,366,986 B1 | 4/2002 | St. Pierre et al. | |
| 6,366,987 B1 | 4/2002 | Tzelnic et al. | |
| 6,385,706 B1 | 5/2002 | Ofek et al. | |
| 6,714,952 B2 | 3/2004 | Dunham et al. | |
| 6,715,098 B2 | 3/2004 | Cheng et al. | |
| 6,718,352 B1 | 4/2004 | Dang et al. | |
| 7,024,427 B2 * | 4/2006 | Bobbitt et al. | 1/1 |
| 7,055,008 B2 | 5/2006 | Niles et al. | |
| 7,058,788 B2 | 6/2006 | Niles et al. | |
| 7,093,127 B2 | 8/2006 | McNulty | |
| 7,120,631 B1 * | 10/2006 | Vahalia et al. | 707/8 |
| 7,146,476 B2 | 12/2006 | Sandorfi et al. | |
| 7,155,585 B2 | 12/2006 | Lam et al. | |
| 7,165,145 B2 | 1/2007 | Lam | |
| 7,216,135 B2 * | 5/2007 | Sawdon et al. | 707/205 |
| 2002/0059505 A1 | 5/2002 | St. Pierre et al. | |
| 2002/0091710 A1 | 7/2002 | Dunham et al. | |
| 2002/0124137 A1 * | 9/2002 | Ulrich et al. | 711/113 |
| 2003/0028718 A1 * | 2/2003 | Blendermann et al. | 711/111 |
| 2003/0074378 A1 | 4/2003 | Midgley et al. | |
| 2003/0105912 A1 | 6/2003 | Noren | |
| 2003/0135514 A1 * | 7/2003 | Patel et al. | 707/102 |
| 2003/0145180 A1 | 7/2003 | McNeil | |
| 2003/0145248 A1 | 7/2003 | McNeil | |
| 2003/0158831 A1 | 8/2003 | Zaremba | |
| 2003/0177149 A1 | 9/2003 | Coombs | |
| 2003/0221076 A1 * | 11/2003 | Milligan et al. | 711/165 |
| 2003/0225800 A1 | 12/2003 | Kavuri | |
| 2004/0088507 A1 | 5/2004 | Satoyama et al. | |
| 2005/0010730 A1 * | 1/2005 | Kano | 711/161 |
| 2005/0108486 A1 | 5/2005 | Sandorfi et al. | |
| 2005/0193235 A1 | 9/2005 | Sandorfi et al. | |
| 2007/0061617 A1 * | 3/2007 | Fujibayashi | 714/6 |
| 2007/0266059 A1 * | 11/2007 | Kitamura | 707/204 |

FOREIGN PATENT DOCUMENTS

| | | |
|---|---|---|
| WO | 9414125 | 6/1994 |
| WO | 99/06912 | 2/1999 |
| WO | 03/025795 | 3/2003 |

OTHER PUBLICATIONS

Supplementary European Search Report from European Application No. 04789325 (dated Oct. 20, 2009).

Notification of Transmittal of the International Search Report and The Written Opinion of the International Searching Authority, or the Declaration issued in PCT Application PCT/US04/32122, filed Sep. 30, 2004.

* cited by examiner

| Type | Size (kB) | Block Count |
|------|-----------|-------------|
| FM   | –         | 1           |
| Data | 64        | 2           |
| Data | 128       | 6           |
| FM   | –         | 1           |
| Data | 64        | 16          |
| ⋮    | ⋮         | ⋮           |
| ⋮    | ⋮         | ⋮           |

FIG. 9

| Filename | |
|---|---|
| 0 | 0 |
| 1 | 0 |
| 2 | 0 |
| 0 | 1 |
| ⋮ | ⋮ |

NFS or CIFS Write Data as Stored

EMULATED STORAGE SYSTEM

RELATED APPLICATIONS

This application is divisional of, and claims priority under 35 U.S.C. §121 to, U.S. patent application Ser. No. 11/016,370 filed Dec. 17, 2004, entitled "Emulated Storage System", which is a continuation-in-part of, and claims priority under 35 U.S.C. §120 to, U.S. patent application Ser. No. 10/954,623 filed Sep. 30, 2004, entitled "Emulated Storage System Supporting Instant Volume Restore," which claims priority under 35 U.S.C. §119(e) to U.S. Provisional Application 60/507,329 filed Sep. 30, 2003, and which is a continuation-in-part of, and claims priority under 35 U.S.C. §120 to, U.S. patent application Ser. No. 10/911,987, filed Aug. 5, 2004, which claims the benefit under 35 U.S.C. §119(e) of U.S. Provisional Application No. 60/492,576, entitled "Synthetic Full Back-up Method," filed on Aug. 5, 2003 and U.S. Provisional Application No. 60/492,827, entitled "End-User File Restore Method," filed on Aug. 6, 2003, each of which is hereby incorporated by reference in its entirety.

BACKGROUND

1. Field of Invention

Aspects of the present invention relate to data storage, and more particularly to apparatus and methods for emulating a tape storage system that can provide the equivalent of full back-ups using an existing full back-up and subsequent incremental back-ups and can enable end-users to restore data from such back-ups.

2. Discussion of Related Art

Many computer systems include one or more host computers and one or more data storage systems that store data used by the host computers. These host computers and storage systems are typically networked together using a network such as a Fibre Channel network, an Ethernet network, or another type of communication network. Fibre Channel is a standard that combines the speed of channel-based transmission schemes and the flexibility of network-based transmission schemes and allows multiple initiators to communicate with multiple targets over a network, where the initiator and the target may be any device coupled to the network. Fibre Channel is typically implemented using a fast transmission media such as optical fiber cables, and is thus a popular choice for storage system networks where large amounts of data are transferred.

An example of a typical networked computing environment including several host computers and back-up storage systems is shown in FIG. 1. One or more application servers 102 are coupled via a local area network (LAN) 103 to a plurality of user computers 104. Both the application servers 102 and the user computers 104 may be considered "host computers." The application servers 102 are coupled to one or more primary storage devices 106 via a storage area network (SAN) 108. The primary storage devices 106 may be, for example, disk arrays such as are available from companies like EMC Corporation, IBM Corporation and others. Alternatively, a bus (not shown) or other network link, such as a Fibre Channel link, may provide an interconnect between the application servers and the primary storage devices 106. The bus and/or Fibre Channel network connection may operate using a protocol, such as the Small Component System Interconnect (SCSI) protocol, which dictates a format of packets transferred between the host computers (e.g., the application servers 102) and the storage device(s) 106.

It is to be appreciated that the networked computing environment illustrated in FIG. 1 is typical of a large system as may be used by, for example, a large financial institution or large corporation. It is to be understood that many networked computing environments need not include all the elements illustrated in FIG. 1. For example, a smaller networked computing environment may simply include host computers connected directly, or via a LAN, to a storage device. In addition, although FIG. 1 illustrates separate user computers 104, application servers 102 and media servers 114, these functions may be combined into one or more computers.

In addition to primary storage devices 106, many networked computer environments include at least one secondary or back-up storage system 110. The back-up storage system 110 may typically be a tape library, although other large capacity, reliable secondary storage systems may be used. Typically, these secondary storage systems are slower than the primary storage devices, but include some type of removable media (e.g., tapes, magnetic or optical disks) that may be removed and stored off-site.

In the illustrated example, the application servers 102 may be able to communicate directly with the back-up storage system 110 via, for example, an Ethernet or other communication link 112. However, such a connection may be relatively slow and may also use up resources, such as processor time or network bandwidth. Therefore, a system such as illustrated may include one or more media servers 114 that may provide a communication link, using for example, Fibre Channel, between the SAN 108 and the back-up storage system 110.

The media servers 114 may run software that includes a back-up/restore application that controls the transfer of data between host computers (such as user computers 104, the media servers 114, and/or the application servers 102), the primary storage devices 106 and the back-up storage system 110. Examples of back-up/restore applications are available from companies such as Veritas, Legato and others. For data protection, data from the various host computers and/or the primary storage devices in a networked computing environment may be periodically backed-up onto the back-up storage system 110 using a back-up/restore application, as is known in the art.

Of course, it is to be appreciated that, as discussed above, many networked computer environments may be smaller and may include fewer components than does the exemplary networked computer environment illustrated in FIG. 1. Therefore, it is also to be appreciated that the media servers 114 may in fact be combined with the application servers 102 in a single host computer, and that the back-up/restore application may be executed on any host computer that is coupled (either directly or indirectly, such as through a network) to the back-up storage system 110.

One example of a typical back-up storage system is a tape library that includes a number of tape cartridges and at least one tape drive, and a robotic mechanism that controls loading and unloading of the cartridges into the tape drives. The back-up/restore application provides instructions to the robotic mechanism to locate a particular tape cartridge, e.g., tape number 0001, and load the tape cartridge into the tape drive so that data may be written onto the tape. The back-up/restore application also controls the format in which data is written onto the tapes. Typically, the back-up/restore application may use SCSI commands, or other standardized commands, to instruct the robotic mechanism and to control the tape drive(s) to write data onto the tapes and to recover previously written data from the tapes.

Conventional tape library back-up systems suffer from a number of problems including speed, reliability and fixed capacity. Many large companies need to back-up Terabytes of data each week. However, even expensive, high-end tapes can usually only read/write data at speeds of 30-40 Megabytes per second (MB/s), which translates to about 50 Gigabyte per hour (GB/hr). Thus, to back-up one or two Terabytes of data to a tape back-up system may take at least 10 to 20 hours of continuous data transfer time.

In addition, most tape manufacturers will not guarantee that it will be possible to store (or restore) data to/from a tape if the tape is dropped (as may happen relatively frequently in a typical tape library because either a human operator or the robotic mechanism may drop a tape during a move or load operation) or if the tape is exposed to non-ideal environmental conditions, such as extremes in temperature or moisture. Therefore, a great deal of care needs to be taken to store tapes in a controlled environment. Furthermore, the complex machinery of a tape library (including the robotic mechanism) is expensive to maintain and individual tape cartridges are relatively expensive and have limited lifespans.

SUMMARY OF INVENTION

Embodiments of the present invention provide a back-up storage system that overcomes or alleviates some or all of the problems of conventional tape library systems and that may provide greater flexibility than do conventional tape library systems.

In broad overview, aspects and embodiments of the present invention provide a random-access based storage system that emulates a conventional tape back-up storage system such that an application, such as a back-up/restore application, sees the same view of devices and media as with a physical tape library. The storage system of the invention uses software and hardware to emulate physical tape media and replace them with one or more random-access disk arrays, translating tape format, linear, sequential data to data that is suitable for storage on disk. In addition, applications implemented in hardware and/or software are provided for recovering the data stored on the back-up storage system.

According to one embodiment, a method is provided comprising acts of receiving data corresponding to a sequence of files to be stored on a sequential storage medium, and storing the data corresponding to each of the files in the sequence of files on a randomly accessible storage medium. The data includes first data corresponding to a first file in the sequence of files and second data corresponding to a second file in the sequence of files, the first data being received prior to the second data, and the method further comprises acts of maintaining first metadata identifying locations on the randomly accessible storage medium where the first data and the second data are stored, and maintaining second metadata identifying an order in which the first file and the second file were received.

According to another embodiment, a back-up storage system is provided. The back-up storage system comprises a randomly accessible storage medium, a front-end interface, and a back-end interface. The front-end interface emulates a sequential storage medium, communicates with external devices using a protocol that supports the sequential storage medium, and receives sequential-format data from the external devices, and the back-end interface receives the sequential-format data from the front-end interface and stores the sequential-format data on the randomly-accessible storage medium.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 9 is a visual representation depicting one example of a tape directory structure according to aspects of the invention;

DETAILED DESCRIPTION

Figure 1:
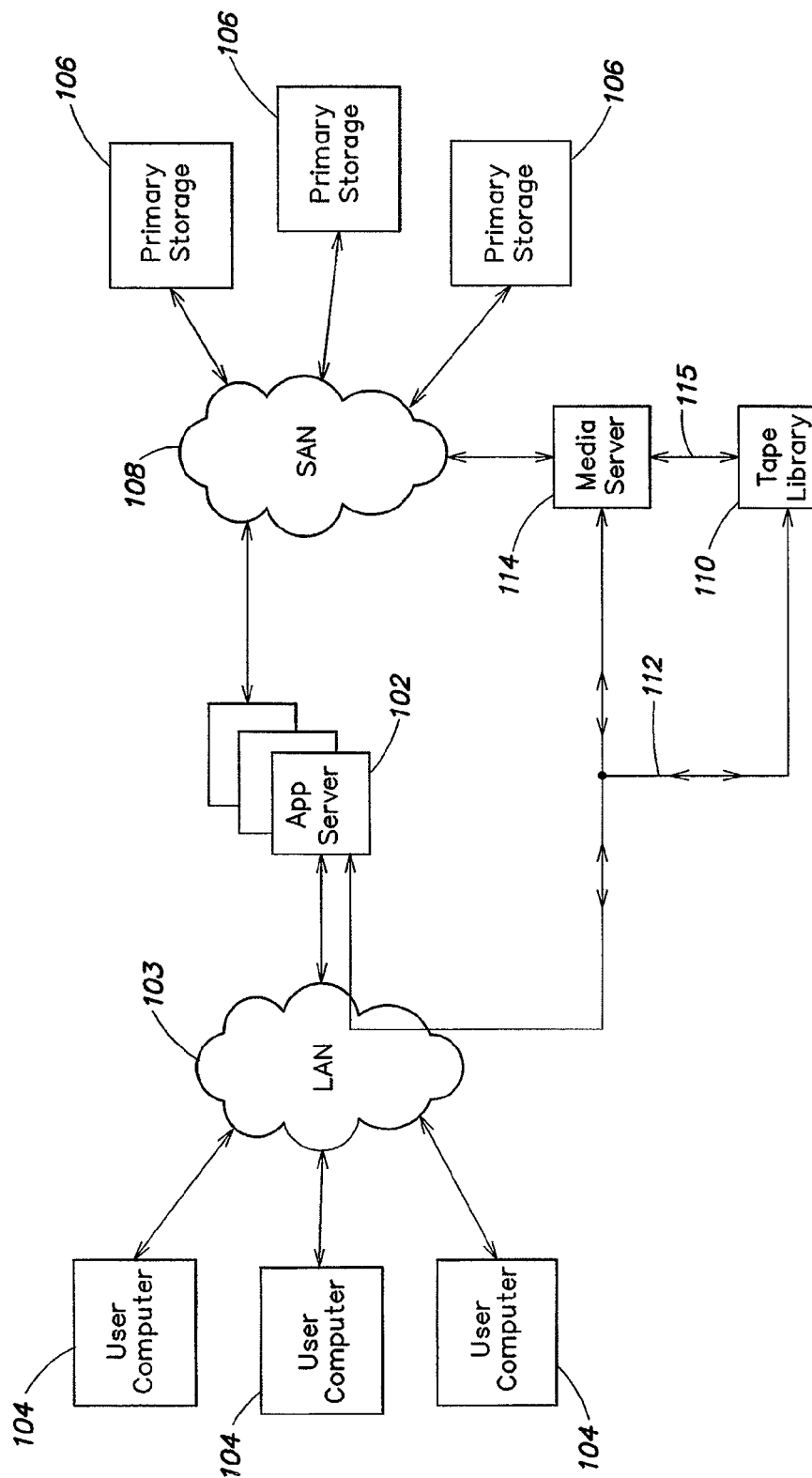
FIG. 1 is a block diagram of one example of a large-scale networked computing environment that includes a back-up storage system.

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

In broad overview, aspects and embodiments of the present invention provide a virtual removable media library back-up storage system that may use one or more disk arrays to emulate a removable media based storage system. Using embodiments of the invention, data may be backed-up onto the disk array(s) using the same back-up/restore application as would have been used to back-up the data onto removable media (such as tapes, magnetic disks, optical disks, etc.), without a user having to make any modifications or adjustments to the existing back-up procedures or having to purchase a new back-up/restore application. In one embodiment, described in detail herein, the removable media that are emulated are tapes, and the back-up storage system of the invention emulates a tape library system including tapes and the robotic mechanism used to handle tapes in a conventional tape library system. Thus, according to at least one embodiment, a randomly-accessible storage system emulates a conventional tape back-up storage system such that a back-up/restore application sees the same view of devices and media as with a physical tape library. In addition, applications implemented in hardware and/or software are provided for recovering the data stored on the back-up storage system.

A storage system according to aspects of the invention includes hardware and software (which may include "firmware") that together interface with a host computer (running the back-up/restore application) and a back-up storage media. The storage system may be designed to emulate tapes, or other types of removable storage media, such that the back-up/restore application sees the same view of devices and media as with a physical tape library, and to translate linear, sequential, tape format data into data that is suitable for storage on random-access disks. In this manner, the storage system of the invention may provide enhanced functionality (such as, allowing users to search for individual backed-up user files, as discussed below) without requiring new back-up/restore application software or policies.

It is to be appreciated that as used herein, the term "host computer" refers to any computer that has at least one processor, such as a personal computer, a workstation, a mainframe, a networked client, a server, etc. that is capable of communication with other devices, such as a storage system or other host computers. Host computers may include media servers and application servers (as described previously with reference to FIG. 1) as well as user computers (which may be user workstations, PCs, mainframes, etc.). In addition, within this disclosure, the term "networked computer environment" includes any computing environment in which a plurality of host computers are connected to one or more shared storage systems in such a manner that the storage system(s) can communicate with each of the host computers. Fibre Channel is one example of a communication network that may be used with embodiments of the present invention. However, it is to be appreciated that the networks described herein are not limited to Fibre Channel, and that the various network components may communicate with each other over any network connection, such as Token Ring or Ethernet instead of, or in addition to Fibre Channel, or over combinations of different network connections. Therefore, any reference to Fibre Channel in the following discussion is intended to incorporate other network connections as well. Moreover, aspects of the present invention may also be used in bus topologies, such as SCSI or parallel SCSI.

Figure 2:
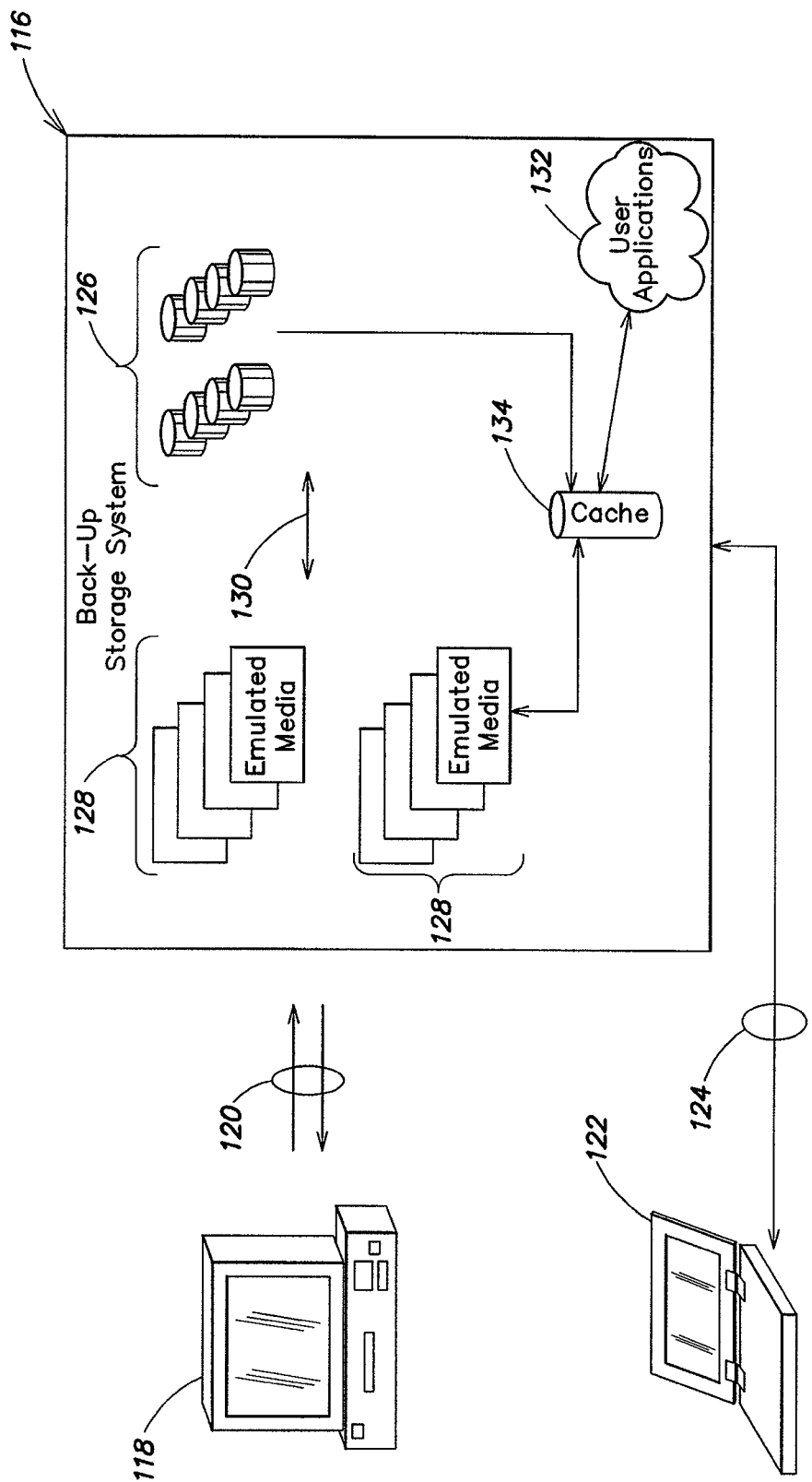
FIG. 2 is a block diagram of one embodiment of a networked computing environment including a storage system according to aspects of the invention.

Referring to FIG. 2, there is illustrated in block diagram form, one embodiment of a networked computing environment including a back-up storage system 116 according to aspects of the invention. As illustrated, a host computer 118 is coupled to the storage system 116 via a network connection 120. This network connection 120 may be, for example a Fibre Channel connection to allow high-speed transfer of data between the host computer 118 and the storage system 116. It is to be appreciated that the host computer 118 may be, or may include, one or more application servers 102 (see FIG. 1) and/or media servers 114 (see FIG. 1) and may enable back-up of data from either any one or more of the computers present in the networked computing environment or from one or more primary storage systems 110 (see FIG. 1). In addition, one or more user computers 122 may also be coupled to the storage system 116 via another network connection 124, such as an Ethernet connection. As discussed in detail below, the back-up storage system 116 may enable users of the user computer 122 to view and optionally, to restore backed-up user files from the back-up storage system.

The storage system 116 includes back-up storage media 126 that may be, for example, one or more disk arrays, as discussed in more detail below. The back-up storage media 126 provide the actual storage space for backed-up data from the host computer(s) 118. However, the storage system 116 may also include software and additional hardware that emulates a removable media storage system, such as a tape library, such that, to the back-up/restore application running on the host computer 118, it appears as though data is being backed-up onto conventional removable storage media. Thus, as illustrated in FIG. 2, the storage system 116 may include "emulated media" 128 which represent, for example, virtual or emulated removable storage media such as tapes. These "emulated media" 128 are presented to the host computer by the storage system software and/or hardware and appear to the host computer 118 to be physical storage media. Further interfacing between the emulated media 128 and the actual back-up storage media 126 may be a storage system controller (not shown) and a switching network, represented by arrow 130, that accepts the data from the host computer 118 and stores the data on the back-up storage media 126, as discussed more fully in detail below. In this manner, the storage system "emulates" a conventional tape (or other removable media) storage system to the host computer 118.

As discussed in detail below, embodiments of the back-up storage system according to the invention may include one or more user applications 132 that provide further functionality for the back-up storage system. Some examples of such user applications may include a synthetic full back-up application and an end-user restore application. In brief overview, the synthetic full back-up application is capable of creating a synthetic full back-up data set from one existing full back-up data set and one or more incremental back-up data sets. The synthetic full backup data set may obviate the need to perform periodic (e.g., weekly) full back-ups, thereby saving considerable time and network resources. Details of the synthetic full back-up application are described further below. The end-user restore application, also described more fully in detail below, enables end-users (e.g., operators of the user computers 122) to browse, locate, view and/or restore previously backed-up user files from the storage system 116. These and other user applications may use metadata relating to the data that is backed up from the host computer 118 onto the storage system 116 to provide enhanced functionality. Thus, according to one embodiment, the back-up storage system 116 may include a "logical metadata cache" 134 that stores such metadata so that the metadata can be accessed by the user applications 132. As used herein, the term "metadata" refers to data that represents information about user or system data and describes attributes of actual user or system data. The logical metadata cache 134 represents a searchable collection of data that enables users and/or software applications to randomly locate backed-up files, compare backed-up files with one another, and otherwise access and manipulate backed-up files.

As discussed above, the storage system 116 includes hardware and software that interface with the host computer 118 and the back-up storage media 126. As used herein, the term "software" may include what is conventionally known in the art as "firmware" (e.g., software embodied in a hardware device such as a ROM, PROM, EPROM, or other programmable device). Together, the hardware and software of embodiments of the invention may emulate a conventional tape library back-up system such that, from the point of view of the host computer 118, data appears to be backed-up onto tape, but is in fact backed-up onto another storage medium, such as, for example, a plurality of disk arrays.

Figure 3:
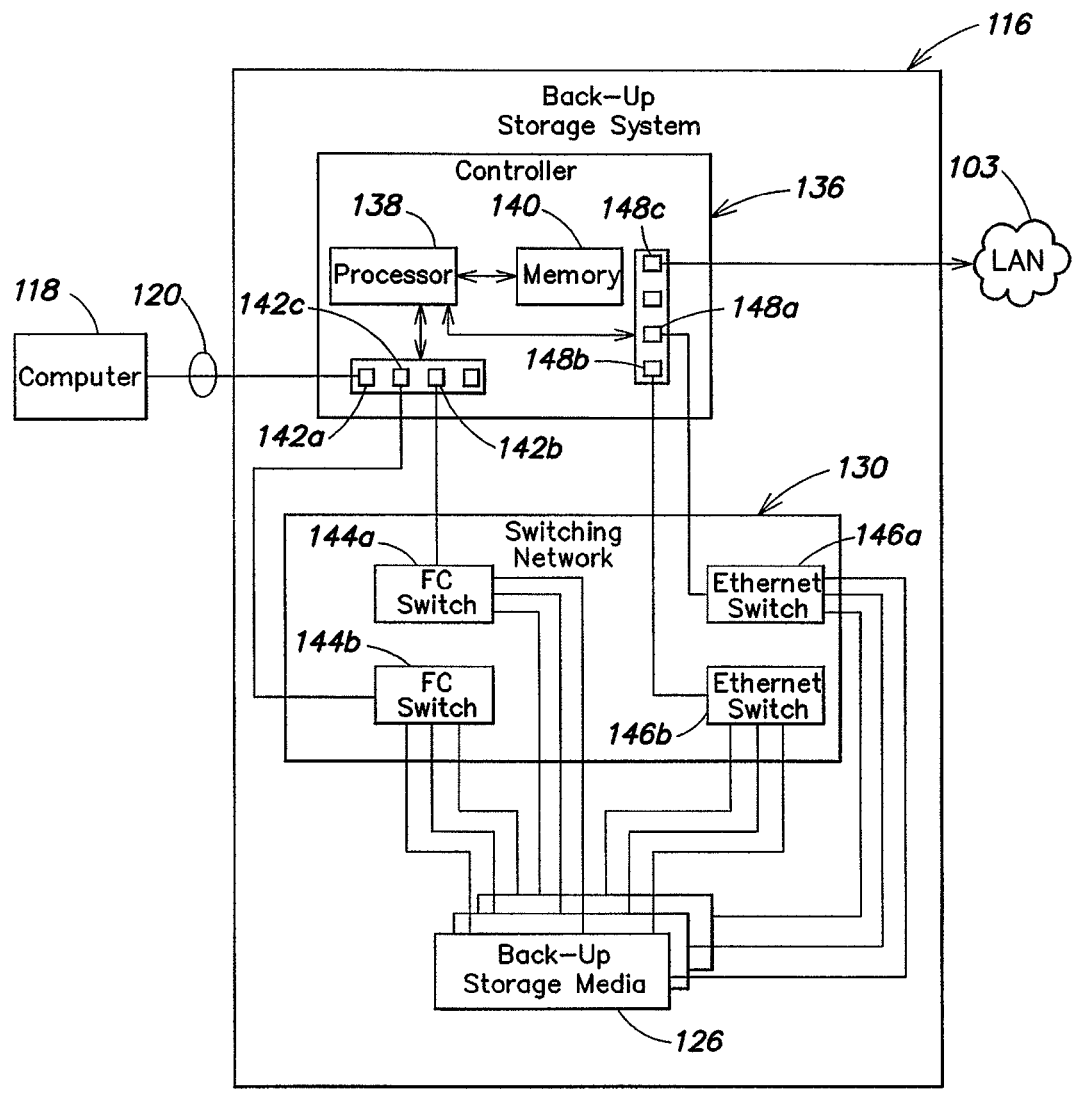
FIG. 3 is block diagram illustrating a virtual layout of one embodiment of some components of a storage system according to aspects of the invention.

Referring to FIG. 3, there is illustrated in block diagram form, one embodiment of hardware components of a back-up storage system 116 according to aspects of the invention. In one example, the hardware of the storage system 116 includes a storage system controller 136 and the switching network 130 that connects the storage system controller 136 to the back-up storage media 126. The storage system controller 136 includes a processor 138 (which may be a single processor or multiple processors) and a memory 140 (such as RAM, ROM, PROM, EEPROM, Flash memory, etc. or combinations thereof) that may run all or some of the storage system software. The memory 140 may also be used to store metadata relating to the data stored on the back-up storage media 126. Software, including programming code that implements embodiments of the present invention, is generally stored on a computer readable and/or writeable nonvolatile recording medium, such as RAM, ROM, optical or magnetic disk or tape, etc., and then copied into memory 140 wherein it may then be executed by the processor 138. Such programming code may be written in any of a plurality of programming languages, for example, Java, Visual Basic, C, C#, or C++, Fortran, Pascal, Eiffel, Basic, COBAL, or combinations thereof, as the present invention is not limited to a particular programming language. Typically, in operation, the processor 138 causes data, such as code that implements embodiments of the present invention, to be read from a nonvolatile recording medium into another form of memory, such as RAM, that allows for faster access to the information by the processor than does the nonvolatile recording medium.

As shown in FIG. 3, the controller 136 also includes a number of port adapters 142a, 142b, 142c that connect the controller 136 to the host computer 118 and to the switching network 130. As illustrated, the host computer 118 is coupled to the storage system via a port adapter 142a, which may be, for example, a Fibre Channel port adapter. Via storage system controller 136, the host computer 118 backs up data onto the back-up storage media 126 and can recover data from the back-up storage media 126.

In the illustrated example, the switching network 130 may include one or more Fibre Channel switches 144a, 144b. The storage system controller 136 includes a plurality of Fibre Channel port adapters 142b and 142c to couple the storage system controller to the Fibre Channel switches 144a, 144b. Via the Fibre Channel switches 144a, 144b, the storage system controller 136 allows data to be backed-up onto the back-up storage media 126. As illustrated in FIG. 3, the switching network 130 may further include one or more Ethernet switches 146a, 146b that are coupled to the storage system controller 136 via Ethernet port adapters 148a, 148b. In one example, the storage system controller 136 further includes another Ethernet port adapter 148c that may be coupled to, for example, a LAN 103 to enable the storage system 116 to communicate with host computes (e.g., user computers), as discussed below.

In the example illustrated in FIG. 3, the storage system controller 136 is coupled to the back-up storage media 126 via a switching network that includes two Fibre Channel switches and two Ethernet switches. Provision of at least two of each type of switch within the storage system 116 eliminates any single points of failure in the system. In other words, even if one switch (for example, Fibre Channel switch 144a) were to fail, the storage system controller 136 would still be able to communicate with the back-up storage media 126 via another switch. Such an arrangement may be advantageous in terms of reliability and speed. For example, as discussed above, reliability is improved through provision of redundant components and elimination of single points of failure. In addition, in some embodiments, the storage system controller is able to back-up data onto the back-up storage media 126 using some or all of the Fibre Channel switches in parallel, thereby increasing the overall back-up speed. However, it is to be appreciated that there is no requirement that the system comprise two or more of each type of switch, or that the switching network comprise both Fibre Channel and Ethernet switches. Furthermore, in examples wherein the back-up storage media 126 comprises a single disk array, no switches at all may be necessary. In one embodiment, the Fibre Channel switches 144a, 144b may be used primarily for transferring data between the controller 136 and the back-up storage media 126, and the Ethernet switches 146a, 146b may be used primarily for transferring control information between the controller 136 and the back-up storage media 126.

As discussed above, in one embodiment, the back-up storage media 126 may include one or more disk arrays. In one preferred embodiment, the back-up storage media 126 include a plurality of ATA or SATA disks. Such disks are "off the shelf" products and may be relatively inexpensive compared to conventional storage array products from manufacturers such as EMC, IBM, etc. Moreover, when one factors in the cost of removable media (e.g., tapes) and the fact that such media have a limited lifetime, such disks are comparable in cost to conventional tape-based back-up storage systems. In addition, such disks can read/write data substantially faster than can tapes. For example, over a single Fibre Channel connection, data can be backed-up onto a disk at a speed of at least about 150 MB/s, which translates to about 540 GB/hr, significantly faster (e.g., by an order of magnitude) than tape back-up speeds. In addition, several Fibre Channel connections may be implemented in parallel, thereby increasing the speed even further. In accordance with an embodiment of the present invention, back-up storage media may be organized to implement any one of a number of RAID (Redundant Array of Independent Disks) schemes. For example, in one embodiment, the back-up storage media may be configured as a RAID-5 implementation.

As discussed above, embodiments of the invention emulate a conventional tape library back-up system using disk arrays to replace tape cartridges as the physical back-up storage media, thereby providing a "virtual tape library." Physical tape cartridges that would be present in a conventional tape library are replaced by what is termed herein as "virtual cartridges." It is to be appreciated that for the purposes of this disclosure, the term "virtual tape library" refers to an emulated tape library which may be implemented in software and/or physical hardware as, for example, one or more disk array(s). It is further to be appreciated that although this discussion refers primarily to emulated tapes, the storage system may also emulate other storage media, for example, a CD-ROM or DVD-ROM, and that the term "virtual cartridge" refers generally to emulated storage media, for example, an emulated tape or emulated CD. In one embodiment, the virtual cartridge in fact corresponds to one or more hard disks.

Therefore, in one embodiment, an interface is provided for a randomly-accessible storage systems that enables the storage system to emulate the tape library storage system, such that, to the back-up/restore application, it appears that the data is being backed-up onto tape. However, the tapes of the emulated tape library are replaced by one or more disk arrays such that the data is in fact being backed-up onto these disk array(s). It is to be appreciated that other types of removable media storage systems may be emulated and the invention is not limited to the emulation of tape library storage systems. The following discussion will now explain various aspects, features and operation of the software included in the storage system 116.

It is to be appreciated that although the software described further in detail below may be described as being "included" in the storage system 116, and may be executed by the processor 138 of the storage system controller 136 (see FIG. 3), there is no requirement that all the software be executed on the storage system controller 136. The software programs such as the synthetic full back-up application and the end-user restore application may be executed on the host computers and/or user computers and portions thereof may be distributed across all or some of the storage system controller, the host computer(s), and the user computer(s). Thus, it is to be appreciated that there is no requirement that the storage system controller be a contained physical entity such as a computer. The storage system 116 may communicate with software that is resident on a host computer such as, for example, the media server(s) 114 or application servers 102. In addition, the storage system may contain several software applications that may be run or may be resident on the same or different host computers. Moreover, it is to be appreciated that the storage system 116 is not limited to a discrete piece of equipment, although in some embodiments, the storage system 116 may be embodied as a discrete piece of equipment. In one example, the storage system 116 may be provided as a self-contained unit that acts as a "plug and play" replacement for conventional tape library back-up systems (i.e., no modification need be made to existing back-up procedures and policies). Such a storage system unit may also be used in a networked computing environment that includes a conventional back-up system to provide redundancy or additional storage capacity.

As discussed above, according to one embodiment, the host computer 118 (which may be, for example, an application server 102 or media server 114, see FIG. 1) may back-up data onto the back-up storage media 126 via the network link (e.g., a Fibre Channel link) 120 that couples the host computer 118 to the storage system 116. It is to be appreciated that although the following discussion will refer primarily to the back-up of data onto the emulated media, the principles apply also to restoring backed-up data from the emulated media. The flow of data between the host computer 118 and the emulated media 128 may be controlled by an application, such as the back-up/restore application, as discussed above. From the view point of the back-up/restore application, it may appear that the data is actually being backed-up onto a physical version of the emulated media (e.g., onto a tape cartridge).

Figure 4:
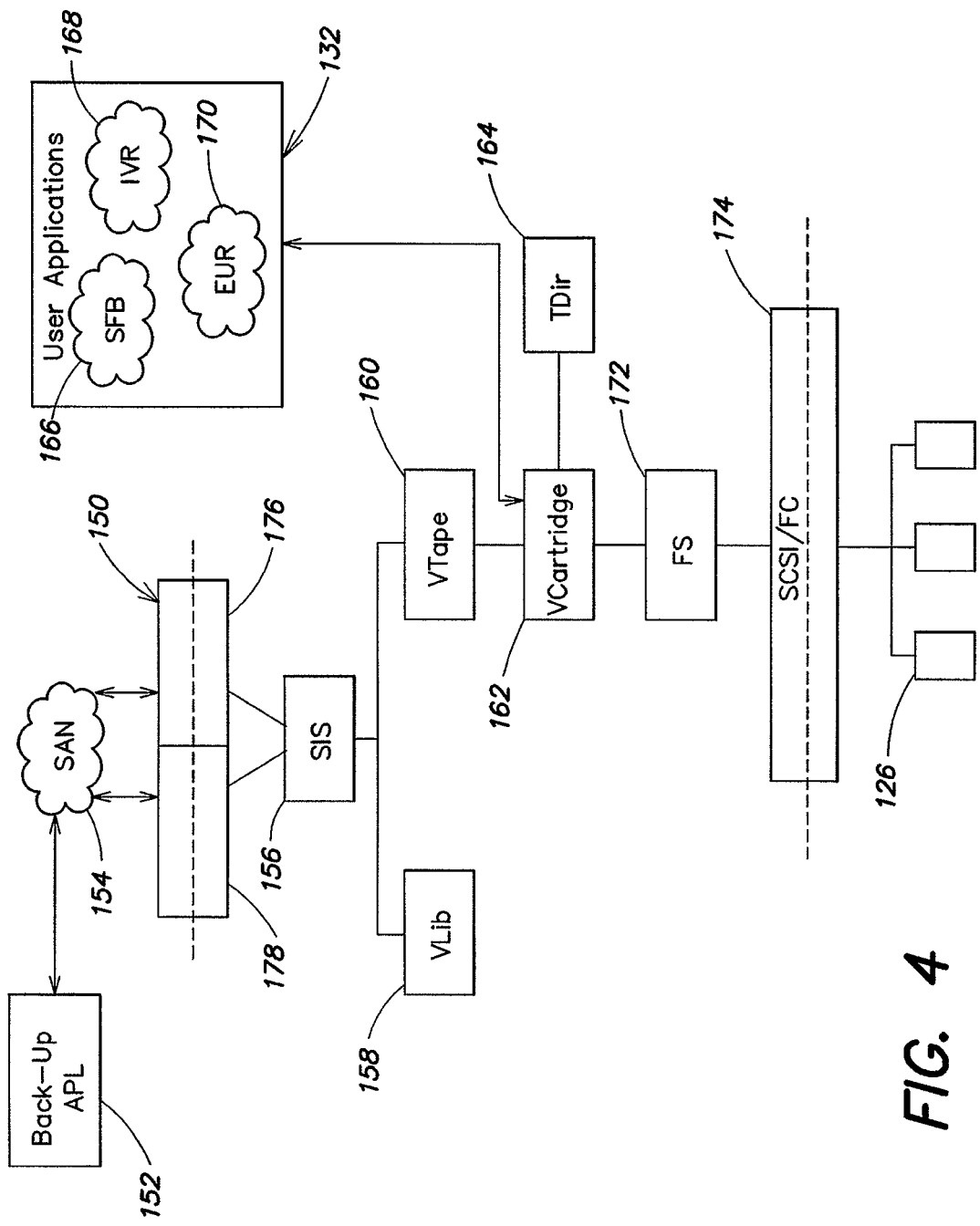
FIG. 4 is a block diagram representing several hardware and software components of a back-up storage system according to aspects of the invention.

Referring to FIG. 4, there is illustrated one embodiment of various components of a back-up storage system according to aspects of the invention. The back-up storage system includes one or more Fibre Channel port adapters (not shown) and one or more associated Fibre Channel drivers 150 that provide a connection interface between a back-up/restore application 152 (which may be connected via a storage area network 154 and may be executed, for example, on a host computer) and other components of the back-up storage system, and allow data to be stored on (and retrieved from) the back-up storage system. Fibre Channel port adapters and associated driver(s) are available from such companies as Qlogic Corporation and LsiLogic Corporation, and as the construction and operation of such port adapters and associated drivers is well known in the art, further details are omitted herein.

Data received from the Fibre Channel driver 150 and data provided to Fibre Channel driver 150 is controlled by an interface component 156, referred to herein as a SCSI Interface System or SiS that provides memory and buffer management. Although other protocols may be used interface component 156, the vast majority of data communicated to storage systems over the Fibre Channel protocol utilize an underlying SCSI protocol.

The back-up storage system also includes a number of other components, including a virtual library component 158, a virtual tape component 160, a virtual cartridge component 162, and a data management component 172. These components may include software that provides a file system for managing data on the back-up storage system, specifically for formulating virtual cartridges and maintaining relationships between these virtual cartridges and the data stored on the back-up storage media 126. According to one embodiment, these components provide a SCSI interface to the back-up storage media 126 that makes it appear, to devices communicating with the storage system 116, that the storage system 116 is a conventional SCSI compliant tape library storage system by emulating the SCSI commands that would be used by such a system. In addition, these components track metadata relating to the files that are backed-up onto the back-up storage system so as to provide enhanced functionality over ordinary tapes by enabling users to easily locate and manipulate individual files. Thus, the back-up storage system of the invention emulates a tape library, handles large sequential data streams as does a tape library, but in addition provides many benefits associated with random-access based storage, as discussed below.

The virtual library component 158, referred to herein as VLib 158, provides generic removable-media library support to support a wide array of library devices, as discussed further in detail below. In brief overview, VLib 158 emulates the set of SCSI commands that would be used to control some of the mechanical components of a conventional tape library back-up system (such as tape drives and a robotic mechanism for moving tapes) so as to allow the back-up storage system of the invention to interface with conventional back-up/restore applications. The virtual tape component, referred to herein as VTape 160, provides sequential data structure support to support a variety of sequential data formats for many different types of emulated media, such as tapes. Thus, in one embodiment, VTape emulates conventional tapes and tape drives. It should be appreciated that VTape 160 may be adapted to support sequential data formats for other types of emulated media that are not tape, such as CD, DVD, etc., and for a wide variety of different tape formats other than those discussed in detail further below.

The virtual cartridge component, referred to herein as VCartridge 162, performs operations on any emulated media device (e.g., a virtual tape cartridge), and is discussed further in detail below. VCartridge 162 is responsible for handling cartridge-specific functions, such as "rewinding" a virtual cartridge, and emulates the SCSI commands that would be used to perform cartridge functions in a real tape library system. VCartridge may include a tape directory component referred to herein as Tdir 164 that defines the layout of data of the emulated media. As shown in FIG. 4, one or more of the user applications 132 (e.g., the synthetic full back-up application 166, the instant volume restore application 168 and the end-user restore application 170) may interface with VCartridge to view and/or manipulate data stored on the emulated media, as discussed below. VLib, VTape and VCartridge together support core SCSI commands such that external devices (such as the back-up/restore application) think that the back-up storage system is an actual tape library system, even though it is not. The benefit of this emulation is that the back-up storage system can communicate with conventional back-up/restore applications (which expect to be communicating with tape libraries) without modification of the back-up/restore application. A user may maintain the same back-up procedures and applications used with a conventional tape library, but replace the library with the back-up storage system of the invention, thereby obtaining the benefits of dynamically-expandable storage capability, rapid back-up times and other advantages of the invention discussed herein.

In addition, the back-up storage system may also include a data management component, referred to herein as FS 172 that controls the storage of the data on the actual storage media 126. The operation of FS 172 is discussed in detail below. It is to be appreciated that although the various components referenced above are described herein generally in terms of software that may be executed by the processor 138 of the storage system controller 136 (see FIG. 3), the present invention is not so limited. Indeed, many of these components mentioned above may be implemented in a combination of software and/or hardware, such as a programmable logic device or ASIC. Further, even when implemented entirely in software, there is no requirement that all the software be executed on the storage system controller 136. In addition to the components enumerated above, the back-up storage system 116 may further include a back-up storage media driver 174 that enables data to be read from and written to the back-up storage media 126. In one embodiment, the back-up storage media driver 174 is implemented as a SCSI/Fibre Channel driver and communicates with a back-up storage media controller (not shown) that ultimately provides the lower level commands to the individual storage devices forming the back-up storage media 126.

According to one embodiment, data is managed through the components illustrated in FIG. 4 to receive data from an external device and store that data on the back-up storage media 126. For example, in executing a "write" command from the back-up/restore application 152, the Fibre Channel driver 150 receives a SCSI write command and a stream of data via a Fibre Channel port adapter 142 (see FIG. 3) and sends an appropriate acknowledgement to the back-up/restore application 152. In this circumstance, the Fibre Channel driver 150 acts as a target because it is receiving a command from an external device. The SiS 156 manages reception of the data by allocating memory to temporarily store the received data and passing the SCSI command to VTape 160 for processing. VTape, along with VCartridge 162 and Tdir 164 process the command and manipulate the data into virtual cartridge format, as discussed further below. VCartridge communicates with the data management component FS 172 to write the data to a storage system file. FS 172 generates appropriate SCSI commands to write the storage system file containing the data to the back-up storage media 126. These SCSI commands are passed to the back-up storage media driver 174 which sends a write request to the back-up storage media 126, as discussed in more detail below. In this circumstance, the back-up storage media driver 174 acts as an initiator because it initiates the write command sent to the back-up storage media to store the data. It is to be appreciated that a similar procedure may be followed for a "read" command or other commands sent from the back-up/restore application 152.

Together the hardware and software of the back-up storage system represent the emulated media and provide an interface between an application (e.g., the back-up/restore application 152) resident on the host computer and the back-up storage media 126. The storage system 116 accepts tape format data from the back-up/restore application 152 and translates that data into data suitable for storage on random-access disks (e.g., hard disks, optical disks and the like). It is to be appreciated that in the following discussion, data sent to the back-up storage system for storing will be referred to as being "stored" on the emulated media, such as, for example, on virtual tape cartridges, however, the data is in fact stored on the back-up storage media 126 in random-access format, as explained below. In addition, although the following discussion focuses on a virtual tape library system, the principles of the invention are equally applicable to other types of removable storage media, for example, optical disks. Embodiments of the back-up storage system of the invention provide a platform for a variety of data protection applications and may accommodate many different tape drive and/or tape library formats Referring to FIGS. 3 and 4, according to one embodiment, the Fibre Channel driver 150 may control operation of all Fibre Channel ports and switches in the back-up storage system. The Fibre Channel driver 150 may be implemented in software incorporated with the controller 136 (see FIG. 3) or may be a separate unit, such as for example, a dedicated chipset. In one example, Fibre Channel connectivity for the back-up storage system 116 may be accomplished using a Fibre Channel adaptor (not shown) that includes, on a chip (or other hardware format) the one or more Fibre Channel ports 142a, 142b, 142c and a Fibre Channel controller (not shown) that interfaces with the switches 144a, 144b. The Fibre Channel adaptor further includes the Fibre Channel driver 150 which may be implemented as software running on the processor 136, the software driver 150 interfacing with the Fibre Channel controller. The Fibre Channel driver 150 is responsible for interfacing with other Fibre Channel devices on the storage area network 108 (FIG. 1), and thus may locate and initialize Fibre Channel devices in the system, create/modify addresses (including a port identification number), the topology, and speed of the Fibre Channel devices in the system, etc. According to one embodiment, the Fibre Channel driver 150 may include a number of distinct drivers, such as a first driver 176 to interface with one or more Fibre Channel port adapters from one manufacturer, such as Qlogic Corporation, and another driver 178 to interface with one or more Fibre Channel port adapters from another manufacturer, such as Lsi-Logic Corporation. The Fibre Channel port adapters of other manufacturers could also be accommodated, although the use of these two such drivers accommodates two of the more commonly used types of port adapters used in the industry. The Fibre Channel driver 150 controls I/O to and from the back-up storage system and ensures that a Fibre Channel port is available to service data requests from the back-up/restore application 152.

Figure 5:
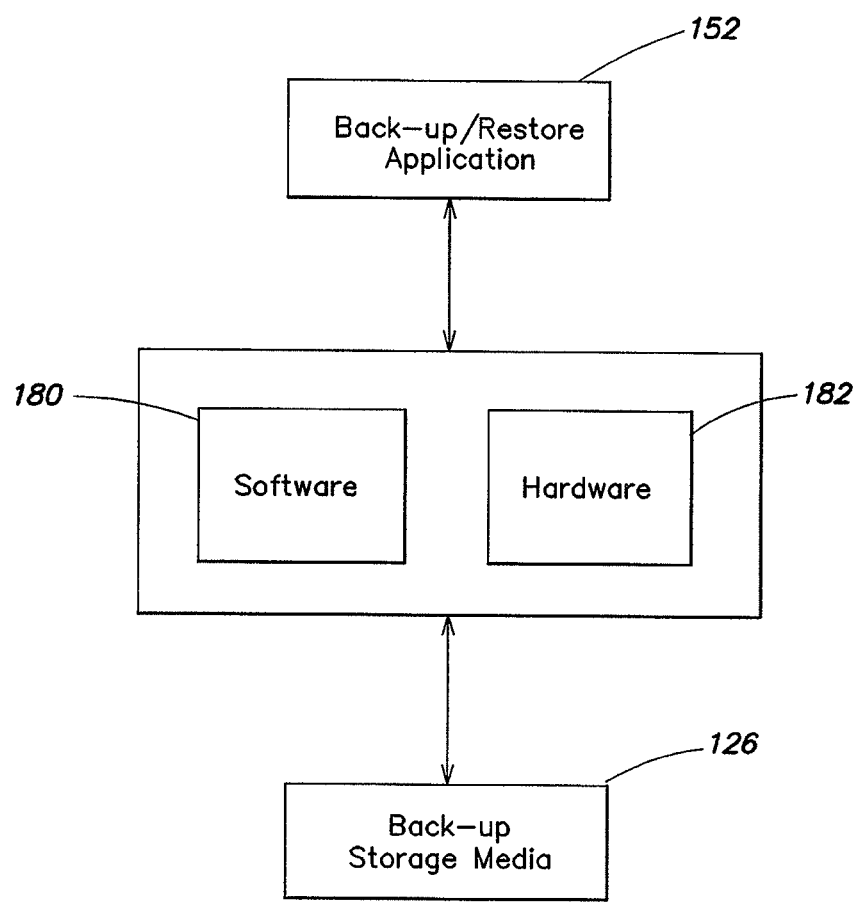
FIG. 5 is a block diagram illustrating one embodiment of a relationship between a back-up/restore application and the hardware and software components of a back-up storage system according to aspects of the invention.

Referring to FIG. 5, there is illustrated a block diagram representing a broad overview of the back-up storage system according to aspects of the invention. The software components 180 and hardware components 182 provide an interface between an application, such as the back-up/restore application 152 and the back-up storage media 126. The hardware components 182 may include hardware associated with the Fibre Channel port adapters and associated driver 150, the SCSI/Fibre Channel hardware associated with communicating with the back-up storage media 126 and associated driver 174 (see FIG. 4), the Fibre Channel switches 144 (see FIG. 3), the Ethernet switches 146 and the controller 136. The software components may include (from FIG. 4) the Fibre Channel driver 150, the back-up storage media driver 174, the SiS 156, the VLib 158, the VTape 160, the VCartridge 162, the Tdir 164 and the data management component FS 172. The software components 180 may provide a SCSI emulation of tapes, tape drives, and also the robotic mechanisms used to transfer tapes to and from the tape drives. This may allow the back-up/restore application 152 to communicate (e.g., back-up or write data to the emulated media) with the back-up storage system using, for example, traditional SCSI commands and the emulated storage media 128 (FIG. 2) to appear to the back-up/restore application as conventional removable back-up storage media (e.g., as tapes on a robotic tape back-up storage system). The hardware components 182 cooperate with the software components 180 to provide Fibre Channel connectivity between host computers and the back-up storage system and interfacing with the back-up storage media 126.

Figure 6:
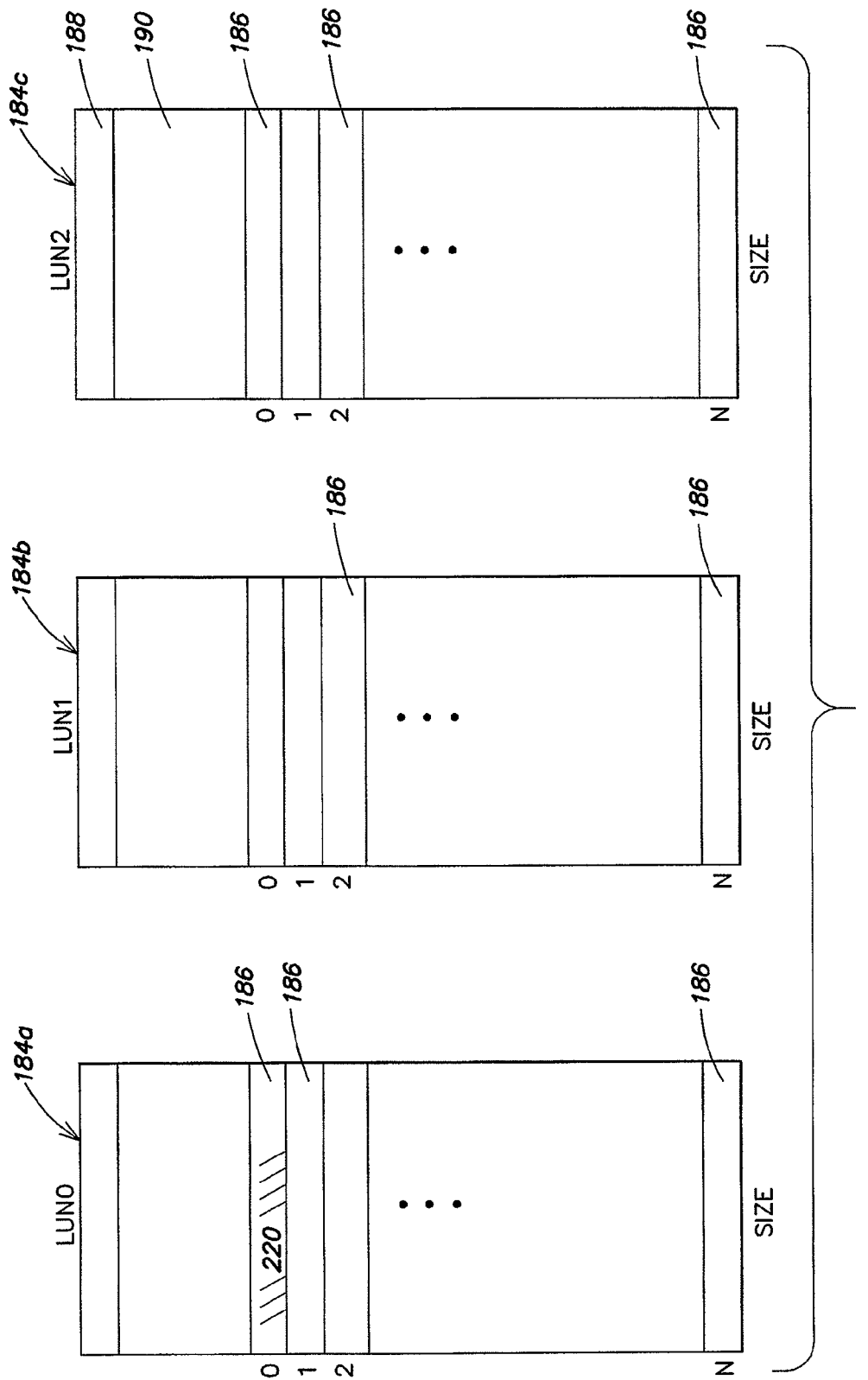
FIG. 6 is a visual representation of one example of a logical unit structure according to aspects of the invention.

According to one embodiment, the back-up storage media 126 may comprise one or more disk arrays that may be configured into "logical units" (LUNS), as illustrated in FIG. 6. An addressed collection of LUNS can be configured as a self-referencing set of disks that provide a storage pool for the back-up storage system. The number LUNS in a system and the number of disks making up each LUN may be selected based on an expected volume of data that the back-up storage system is likely to handle, cost constraints, etc. In the illustrated example, the back-up storage system comprises three LUNS, namely, LUN0 184*a*, LUN1 184*b* and LUN2 184*c*, however it is to be appreciated that the invention is not so limited and any number of LUNS is contemplated. Each LUN 184 is divided into segments 186 referred to herein as "extents." In addition, each LUN 184 includes a superblock 188 and a logical metadata cache 190 which are described in detail below. The disks making up each LUN may have any size, limited only by manufacturing and pricing constraints. In one embodiment, it may be desirable that the back-up storage system be able to provide a vast storage pool and therefore larger volume disks may be preferred. In one preferred embodiment, each disk making up a LUN may be approximately 250 Gigabytes (GB) in size. It should be appreciated that the size selected for the physical disks making up each LUN (e.g., 250 GB disks) may based upon the availability of such disks at a modest price, and the size of such "commodity disks" may be expected to increase over time. Although larger and more expensive disks could be used, the use of such "commodity disks" permit embodiments of Applicant's invention to offer a storage system that is competitive, in terms of price, with typical robotic-type tape based back-up storage systems, but with significantly better reliability and/or performance.

Referring again to FIG. 4, as discussed above, the back-up storage system 116 may include a back-up storage media driver 174. According to one embodiment, the back-up storage media driver 174 may receive from FS 172 SCSI commands encapsulated in Fibre Channel. These SCSI commands specify actions (such as "read" or "write" data) for the disk array(s) making up the back-up storage media 126. Each disk array may include a disk controller (not shown) that has Fibre Channel connectivity to communicate with the back-up storage media driver 174 and "disk" connectivity to communicate with each of the disks making up the disk array. The disk controller may receive the SCSI commands from the back-up storage media driver 174, (extracting these commands from the Fibre Channel as known in the art), and convert the commands into appropriate ATA, SATA or IDE disk commands, depending on the type of disks used in the disk arrays, as is known in the art. The disk controllers abstract away the actual disks from the point of view of the back-up storage system software and instead present the LUNS as shown in FIG. 6. The disk controllers manage dividing the actual disks into the LUNS and implementing storage techniques, such as RAID-5 or RAID-0 to store the data on the disks, as is known in the art.

As mentioned above, SCSI commands may be used to read data from and write data to the disks. The SCSI standard protocol uses a command bit structure that has 32 bits for specifying a first sector number on the disk (i.e., where the data begins that is to be read or where to begin storing data for a write command) and 24 bits for specifying how many sectors the data extends over. Therefore, using the SCSI standard protocol, the largest number of sectors that may be addressed on any disk array is four billion (binary equivalent of 32 bits) and the largest number of sectors over which a file may extend is sixteen million (binary equivalent of 24 bits). In a typical disk, each sector is 512 bytes in length. Therefore, conventional SCSI addressing limits the size of a LUN to two Terabytes (four billion times 512 bytes). Accordingly, in one preferred embodiment, each LUN 184 is selected to be two Terabytes (TB) in size. A typical tape cartridge in a conventional tape library back-up system may be between 100 GB and 600 GB in size. Therefore, a single LUN in the back-up storage system of the invention may have storage capacity equivalent to approximately twenty tape cartridges. The total capacity of the back-up storage system is selected by choosing a desired number of LUNS, which may be added to as needs arise after system initialization merely by adding additional back-up storage media and then referring to that additional capacity as an additional virtual cartridge or cartridges.

Referring again to FIG. 4, some of the software components of embodiments of the back-up storage system will now be described. The software emulates conventional removable back-up storage media, such as tapes, thereby providing (together with the hardware components) a virtual tape library. Thus, in one embodiment, the SiS 156 provides a front end-interface to the storage system 116 that makes the storage system 116 appear, to other devices on the SAN, to be a SCSI-based robotic tape type back-up storage system. In this regard, the SiS 156 provides "generic" support for a wide array of commercially available robotic tape type back-up storage systems by supporting those SCSI commands that are common (i.e., "generic") to that class of storage system (e.g., to a robotic tape class storage system).

SiS 156 primarily performs management functions for the virtual tape library, including controlling scheduling between read and write requests received from the back-up/restore application 152 and any of the user applications 132. The SiS 156 manages the memory 140 (see FIG. 3) and interfaces with the Fibre Channel driver 150. In one embodiment, the software components 180 (see FIG. 5), including the SiS 156 may be provided within a Linux kernel executed by the processor 138 (see FIG. 3). The SiS 156 may run on a single Linux thread and use a single stack thereby keeping the Linux scheduling queue short and efficiently using system resources. In one embodiment, the SiS 156 may use less than 5% of the processor resources, even under a heavy load (e.g., when handling many requests and large data volume).

According to one embodiment, the SiS 156 manages I/O for the back-up storage system and also provides a buffer manager. The SiS 156 may allocate the size and type of buffers used depending on, for example, the available memory 140, the volume of data to be transferred, the type of request, etc. The SiS 156 may manage system resources, such as kernel memory, to appropriately allocate memory for buffers, messages, sense data and the like. In addition, the SiS 156 may control messaging between devices in the back-up storage system and pass addresses of devices. For example, if LUN0 is to be read, SiS 156 may pass an address of a LUN0 and control messaging between the Fibre Channel driver 150, the SCSI/Fibre Channel driver 174 and the back-up storage media 126. SiS 156 may be adapted to interface with both the QLOGIC Fibre Channel driver 176 and the LSI Fibre Channel driver 178, if both are provided in the back-up storage system. Thus, according to one embodiment, SiS 156 may be hardware independent to allow interfacing with both the QLOGIC driver and the LSI driver and may implement a "generic" SCSI protocol to interface with the back-up storage media 126.

As mentioned above, according to one embodiment, the back-up storage system includes components VLib, VTape, VCartridge and Tdir that emulate conventional removable storage media, such as tapes. It is to be appreciated that although the following discussion will use emulated tape cartridges as an example, the principles of the invention may be applied to other types of removable storage media, such as CDs, DVDs etc. These above-enumerated components handle the translation of commands (generally SCSI commands used by tape devices) that are provided by a back-up/restore application into instructions for storing and accessing data on random-access disks that are the back-up storage media 126. They also make it appear, to externally connected devices, that the back-up storage system 116 is a conventional tape library back up storage system, and not a disk-based storage system. In other words, VLib, VTape and VCartridge allow external devices to believe and operate as though the back-up storage system is in fact a conventional tape library device. The components "keep track" of information and requests from the back-up/restore application so that data that is in fact stored in random-access format on disk arrays making up the LUNS described above can be accessed by the back-up/restore application as though the data were stored sequentially on tape cartridges in a tape library back-up system.

VLib 158 provides tape library support and may support any SCSI media changer. In one embodiment, the majority of commands supported by VLib may be common to all (or almost all) media changers, with minor differences being handled through the use of look-up tables. Emulated tape devices may include, but are not limited to, an IBM LTO-1 and LTO-2 tape device, a QUANTUM SuperDLT320 tape device, a QUANTUM P3000 tape library system, or a STORAGETEK L180 tape library system. A conventional tape library back-up system includes at least one tape drive, a plurality of tapes, and a robotic mechanism for loading tapes into the tape drive, retrieving tapes from the tape drive, and storing the tapes. Therefore, a conventional back-up/restore application 152 when attempting to back up (i.e., write) data to the back-up storage system or read data from the back-up storage system will send commands to the back-up storage system instructing it to use its robotic mechanism to locate and load a desired tape cartridge into the tape drive (for writing or reading) and to remove and store the tape once the write/read operation is complete. In order to allow the back-up storage system of the present invention to be compatible with conventional back-up/restore applications, without changes being necessary to the back-up/restore application, a mechanism (VLib) is provided to handle such tape drive and robotic mechanism commands, even though no actual mechanism or tape drive exists in the back-up storage system. In other words, VLib 158 emulates the set of SCSI commands that would be used to control some of the mechanical components of a conventional tape library back-up system so as to allow the back-up storage system of the invention to interface seamlessly with the back-up/restore application 152.

According to one embodiment, VLib may support any type of SCSI media changer by using a SCSI standard protocol that supports that class of SCSI commands that are common or "generic" to all SCSI media changer devices. VLib manages four types of elements according to the SCSI standard, namely transport elements (e.g., move robot, engage gripper, etc.), storage elements (e.g., the bin and cell number in the tape library where the tape is stored), import/export elements (e.g., receiving a new tape cartridge into the library, placing a tape cartridge into a specific bin and cell for removal, etc.), and data elements (e.g., load a tape cartridge in a tape drive). It should be appreciated that although the requesting device (e.g., the device from which the command was sent) believes it is writing to a physical tape, it is in fact writing to a virtual tape. Therefore, VLib processes such elements and records information that tracks those operations the external requesting device believes are being performed (e.g., a tape was obtained from a certain bin and loaded into a tape drive) so as to be able to properly communicate with the external device. The VLib 158 is responsible for translating SCSI commands into element functions. Some examples of element functions include: create, destroy, swap, print, get, getfirst, getlast, getnext, and add cartridge.

According to one embodiment, VLib uses element commands that contain a specified number of bytes (e.g., sixteen bytes) to record information corresponding to emulated performance of an element function. In other words, if in a conventional tape library, the robot mechanism is commanded to load a cartridge into the tape drive, in the back-up storage system of the present invention, VLib would receive commands from the back-up/restore application to perform corresponding element functions and record information as though those element functions had actually been performed. In one specific example, an element command may contain sixteen bytes organized as follows:

Element type information (1 byte)
Address (2 bytes)
Attributes (including flags, sense code and source address) (5 bytes)
Pointer to Mini Cart (4 bytes)
Pointer to Mini Tape (4 bytes)

In this example, "Mini Cart" and "Mini Tape" are stubs (i.e., data structures that contain certain information, and which may point to other data structures that contain additional information) to represent virtual cartridges and virtual tape drives. For example, the Mini Tape stub may contain information specifying a tape drive's serial number, address (e.g., LUN number), and type, (e.g., that class of information that would typically be associated with a physical cartridge device). Mini Cart may contain information uniquely identifying each virtual cartridge and distinguishing each virtual cartridge from other virtual cartridges stored in the storage system. For example, this information may include a name and an identifying number (e.g., corresponding to a barcode that would typically be present on a physical tape so that the tape could be identified by the robotic mechanism) of the virtual cartridge. This information is recorded and managed by VLib so as to provide an appearance to the back-up/restore application that the data is being stored on a physical tape library system, thereby obviating any need to modify a conventional back-up/restore application. VLib processes instructions that relate to emulating physical movement of tapes in a tape library and recording information that tracks which virtual cartridges have been used to "store" data and where on these virtual cartridges the data is stored.

Referring again to FIG. 4, the back-up storage system may further include a component VTape that provides sequential tape device support. Just as VLib emulates a conventional tape library system, VTape emulates conventional tapes and tape drives. For example, SC-VTape may be capable of emulating all, or almost all, 8 millimeter tape drives using a generic protocol. Any minor differences between tape drives produced by different tape drive manufacturers may be accounted for using lookup tables. VTape 160 interfaces with SiS 156 to handle I/O commands from the back-up/restore application to the emulated media, i.e., virtual tapes, and translates SCSI commands into instructions for the FS 172. VTape accomplishes this emulation in cooperation with VCartridge and Tdir.

It is to be appreciated that, from the point of view of the back-up/restore application, the virtual cartridges appear as physical tape cartridges with all the same attributes and features. Metadata is used to link the stored data to virtual cartridges so that the back-up/restore application can read and write data in cartridge format. The term "metadata" as used herein refers not to user or system file data, but to data that describes attributes of actual user and/or system data.

According to one embodiment, the back-up storage system includes a component VCartridge, as discussed above. VCartridge 162 may handle requests related to a virtual tape cartridge such as, for example, cartridge I/O (reading and writing to a virtual tape cartridge), and tape cartridge format. VCartridge interfaces with SiS 156, Tdir 164 and FS 172 to manage virtual cartridge functions such as, creating virtual cartridges, deleting virtual cartridges, restoring data from virtual cartridges, reading virtual cartridges once "loaded" by VLib, etc. VCartridge is also responsible for translating tape commands, such as fast forward, rewind, and position locate, into instructions that specify an appropriate location on a virtual cartridge such that data can be properly read or written to the virtual cartridge. Each virtual cartridge is not an actual cartridge, but rather a file that may grow dynamically as data is stored. This is in contrast to conventional tape cartridges which have a fixed size. To perform at least some of these functions, VCartridge cooperates with Tdir, as discussed further below.

To the back-up restore application, the virtual cartridges appear as sequentially written tapes and VCartridge is responsible for mapping such tape format data to disk format data. Metadata is extracted from the backed-up file data by the storage system controller to keep track of attributes of the files that are backed-up. For example, such metadata for each file may include the file name, a date of creation or last modification of the file, any encryption information relating to the file, and other information. In addition, metadata may be created by the storage system for each backed-up file that links the backed-up file to a virtual cartridge. Using such metadata, the software provides to the host computer an emulation of tape cartridges so that the back-up/restore application can read and write data in cartridge format.

VCartridge also handles virtual cartridge I/O. Unlike disks which generally have a fixed block size and fixed sector size (e.g., 512 bytes), a tape block size may be variable, for example in a range between one and sixteen MB. Furthermore, unlike random access disks, tape I/O is sequential such that any read operation is dependent on the previous read operation. In one embodiment, VCartridge may be adapted to handle either or both of fixed and variable I/O. For fixed I/O, VCartridge may set a tape block size during a set-up procedure and, when handling a read/write request, may create a SCSI command descriptor block (CDB) that specifies the number of tape blocks to be transferred. For variable I/O, in a read/write request VCartridge may set a tape block size in the CDB and transfer only one tape block per read/write operation.

An important aspect of the software managing the back-up storage system may be conservation of I/O requests because I/O operations may typically be slower operations and require significant system resources. In one example, there are four main areas of I/O, namely load, read, write and flush. VCartridge manages I/O requests so as optimize buffer usage. Large buffers may be preferable for I/O so as to reduce the number of I/O operations needed to transfer data. In one embodiment, buffers may be selected to be larger than the tape block size. In one embodiment, during read or write operations, VCartridge may preserve any data in the buffers between sequential requests rather than flushing the buffers immediately. According to one embodiment, on a flush operation, if the previous request was a read, VCartridge may simply free the buffer as any data is already stored on the back-up storage system. If the previous request was a write request, VCartridge may first contact FS to write the buffered data to the back-up storage media, write corresponding metadata to Tdir, free the buffer and wait until any outstanding disk I/O is complete before signaling the flush operation completed (to prevent a race condition from occurring). In conventional SCSI based-tape drive systems, the tape drive typically supports buffering in the tape drive itself. Therefore, in one embodiment, VCartridge handles I/O buffering such that once the buffer is full, the buffer is sent to FS and the data is written to the back-up storage media; any errors are handled later, as would be the case in a conventional tape drive system.

Figure 7:
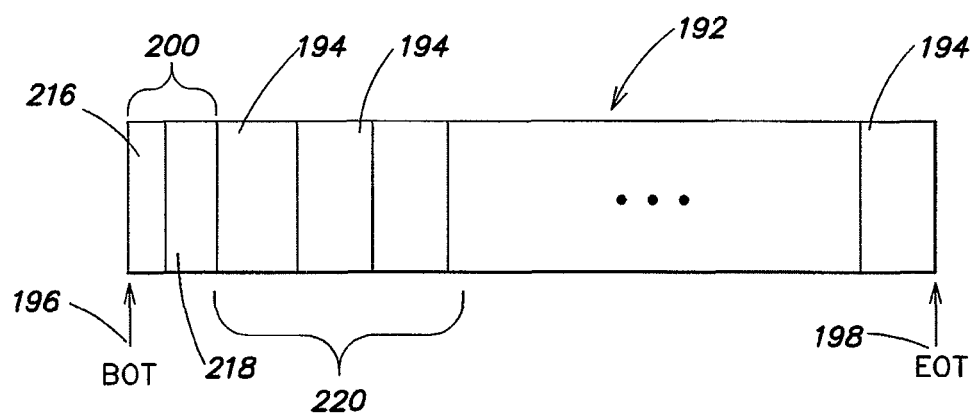
FIG. 7 is a visual representation depicting one example of a layout of a virtual cartridge according to aspects of the invention.

Referring to FIG. 7, there is illustrated one example of a virtual cartridge 192 according to aspects of the invention. The virtual cartridge 192 is divided into a plurality of tape blocks 194 that contain backed-up data. The virtual cartridge 192 includes a beginning-of-tape marker 196 and an end-of-tape marker 198 which may be recorded by VCartridge. The virtual cartridge 192 may also include a header 200 which may include cartridge-specific information, such as the virtual cartridge identifier discussed above and information such as, whether the virtual cartridge is write protected, the dates of creation/modification of the virtual cartridges, and the like, as discussed in more detail below.

Figure 8:
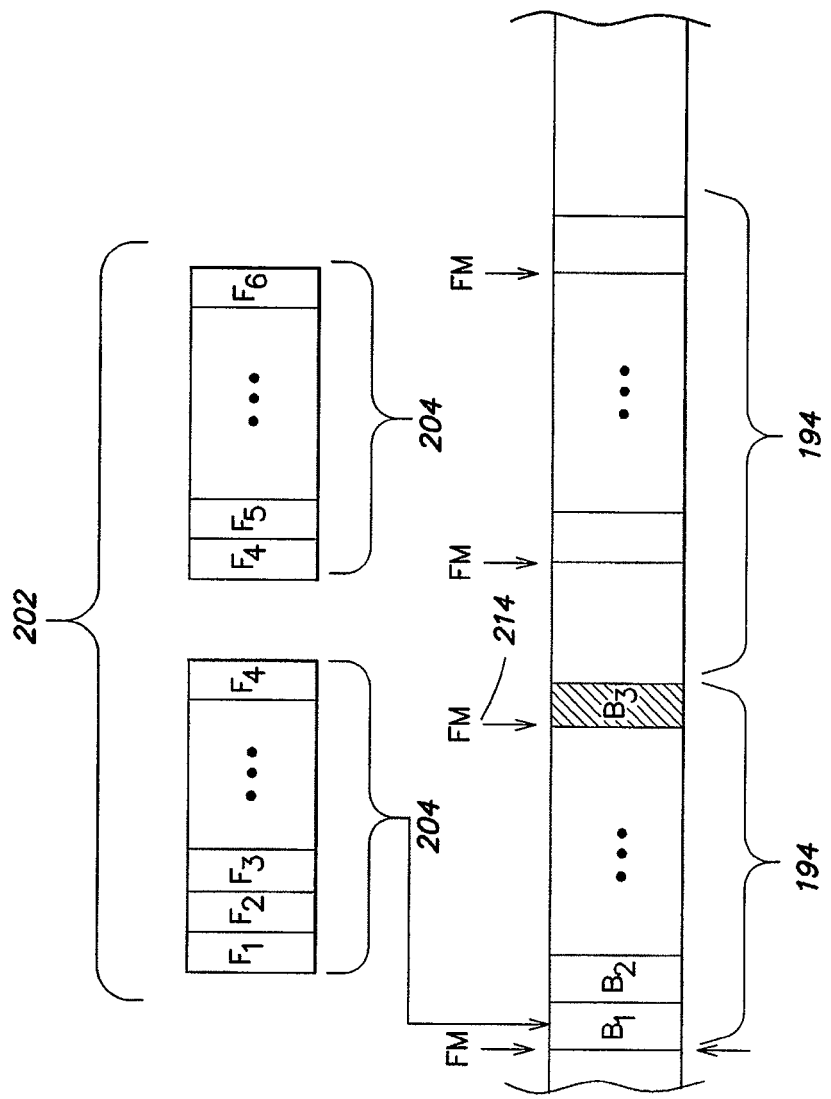
FIG. 8 is a visual representation illustrating a relationship between data received from a back-up/restore application and a virtual cartridge, according to aspects of the invention.

Data from the back-up/restore application may typically be in an archive format, such as tar (UNIX format) or NTbackup, comprising a large data stream 202 made up of a concatenation of user files, system files, directory structure information and the like, as illustrated in FIG. 8. Typically, this data stream is divided by the back-up/restore application into a series of blocks 204. Thus, a data stream 202 from the back-up/restore application may comprise a plurality of files F1, F2, ... etc. (which may be user data files, system files and the like), grouped into a plurality of blocks 204. Each block 204 has a specified block size. In one example, each block 204 may be 64 KB in size, however, it is to be appreciated that the invention is not limited to a 64 KB block size and many different block sizes are contemplated. Each block 204 contains one or more files, as shown. In some examples, a file (e.g., F4) may also extend over more than one block, as illustrated in FIG. 8. VCartridge controls reception of these blocks of back-up data (files) and builds tape blocks 194 to create the virtual cartridge 192. In one example, the tape blocks 194 may be may be one MB in size, corresponding to sixteen 64 KB blocks 204 of files. A virtual cartridge may contain any number of tape blocks 194 and may thus be of any size and may grow dynamically as more files are stored on the virtual cartridges.

According to one embodiment Tdir defines the layout of data on a virtual cartridge. Tdir maintains the relationship (for each virtual cartridge) between the data (wherever it may in fact be stored on the back-up storage media 126) and its location on a virtual cartridge 192. Thus, Tdir enables the back-up/restore application 152 to request a read/write to a virtual cartridge without any knowledge that the data may be stored in a completely different format. According to one example, Tdir may define, down to the byte level, the layout of back-up data on the virtual cartridges. Each virtual cartridge is associated with a Tdir that defines the layout for that specific virtual cartridge.

Referring to FIG. 9, in one embodiment, Tdir may have a table structure for each virtual cartridge, a portion of which is illustrated in FIG. 9. The table includes a column 206 for the type of information stored (e.g., data, a file marker (FM), setmark, end-of-data etc.), a column 208 for the size of the blocks used, for example in kilobytes, and a column 210 that reflects the number of blocks in which the information is stored for each entry (row) in the table. In one example, the table structure may be stored by allocating eight bits to describe the type of data (column 206), twenty-four bits to describe the block size (column 208) and thirty-two bits to count the number of blocks for each entry (column 210). However, it is to be appreciated that other numbers of bits may also be used and selected based on, for example, the expected number of bits needed to efficiently and properly represent the information. For example, twenty-four bits may be used for the block size because, in most tape library systems, the maximum tape block size is sixteen MB, which corresponds to twenty-four bits in binary.

Tdir maintains the relation between the blocks of data provided by the back-up/restore application and the virtual tape. For example, referring to FIGS. 8 and 9, Tdir provides the layout of blocks 204 on the virtual cartridge 192. In the illustrated portion, the first entry in virtual cartridge 192 is a file marker 207. The file marker 207 corresponds to one block having no size because file markers correspond to zero data. However, Tdir records file markers because they are used by conventional tapes and the back-up/restore application thus writes file markers along with data files and expects to see file markers when viewing a virtual cartridge. Therefore, file markers are kept track of by Tdir. Tdir indicates that following file marker 207, there is data in two blocks that are 64 KB in size, corresponding to blocks B1 and B2 in FIG. 8. As mentioned above, blocks 204 may have a size different than 64 KB, and Tdir keeps a record of the block size. Therefore, in the example of FIG. 9, Tdir indicates that the next chunk of information stored on virtual cartridge 192 is data 212 that corresponds to 6 blocks each 128 KB in size. Tdir further indicates that this data is followed by a file marker 214. In this manner, Tdir maintains a description of the virtual cartridge 192.

According to one embodiment, the virtual cartridges are stored as storage system files controlled by FS 172. Each storage system file may correspond to a virtual cartridge or may include multiple virtual cartridges. As discussed above, the virtual cartridge 192 includes a header 200. The header 200 may include a first header portion 216 and a file descriptor 218 as illustrated in FIG. 7. According to one embodiment, the first header portion 216 may contain persistent virtual cartridge metadata that contains information such as, for example, a version of the virtual cartridge, the capacity of the virtual cartridge, the cartridge identifier, whether or not the cartridge is write-protected, a compression format of the cartridge, if used, a name of the virtual library to which the virtual cartridge belongs, the date of last modification of the virtual cartridge, and the remaining capacity (unfilled) of the virtual cartridge. As discussed above, this metadata is monitored by VTape and used to properly emulate physical tape media. The persistent virtual cartridge metadata may also include a list of identifiers of all other virtual cartridges used in the back-up storage system. This allows, for example, VLib to quickly access and present to an external device a list of all the virtual cartridges present in the virtual library in a manner analogous to that in which a tape library system may identify all the physical tape cartridges known to it.

According to one embodiment, the file descriptor 218 may contain searchable metadata relating to the backed-up files stored on the virtual cartridge 192. Metadata provided by the back-up/restore application records the filenames (and optionally other information, such as directory structure relating to the files, etc.) of the files F1, F2 . . . etc., that are contained in each block 204. This metadata is extracted by the back-up storage system software and is maintained in the file descriptor 218 so that the back-up storage system can recover individual files stored on the back-up storage media, as discussed in more detail below. In one embodiment, the file descriptor may be implemented in accordance with a standardized format, such as the tape archive (tar) format used by most UNIX-based computer systems. Each file descriptor may include information such as the filenames of backed-up files on the virtual cartridge, dates on which the backed-up files were created/modified, filesize of the backed-up files, any access restrictions on the backed-up file, etc. Additional information stored in the file descriptor 218 may further include information describing the directory structure from which the backed-up files were copied. In addition, according to one embodiment, the Tdir for each virtual cartridge may be stored in the file descriptor 218 for that virtual cartridge.

As discussed above, the back-up storage system includes a data management component FS 172 (see FIG. 4) that controls storage allocation for data on the back-up storage system and maps backed-up files to the LUNS 184 (see FIG. 6). According to one embodiment, FS 172 may be optimized for sequential access to a small number of very large files and with a very high bandwidth. FS 172 may be LUN size independent and may support any number of disk types, for example, raid-0, raid-1 or raid-5. FS may be distributed across a large number of processors without significant compromise in performance or reliability.

According to one embodiment, FS 172 is based on a large disk allocation (referred to herein as "extents") in a single operation so as to efficiently use disk I/O. In other words, the number of I/O operations may be reduced by writing or reading large extents (e.g., several MB of data per extent) at a time so that a single read/write I/O operation accomplishes the transfer of a large amount of data. Furthermore, the system may be optimized for large data transfer because the system files to be stored may typically be very large, representing a back-up data stream that may be many MB in size. Referring to FIG. 6, the LUNS 184 (which each comprise a number of actual disks) are divided into a plurality of extents 186. The size of each extent may be determined when FS 172 is initialized during set-up of the back-up storage system. All disks making up the LUNS in a set have the same extent size. The number N of extents 186 may depend on the total size of each LUN 184 and the size of each extent 186. The size of the extents 186 may be optimized to reflect the type of data being stored (e.g., virtual cartridges representing data back-up from one or more host computer systems) and the number of distinct sets of such data (e.g., virtual cartridges) that the system can track. For example, data that is typically backed-up to a tape storage system is typically characterized by larger data sets representing numerous system and user files. Because the data sets are so large, the number of discrete data files to be tracked may be correspondingly small. Accordingly, in one embodiment, the size of the extents 186 may selected based on the an expected size of files to be stored on the back-up storage system and to optimize efficiency. In one preferred embodiment, the extents are configured to be 32 Megabytes (MB) in size although it is to be appreciated that the extents may have any size. For example, the extents 186 may be 1 MB or 16 MB in size. In one preferred embodiment mentioned above, the LUN size and the extent size (two TB and 32 MB, respectively) were selected so that the back-up storage system may quickly and efficiently handle large amounts of data, stored as large files, without having to manage a vast number of small address blocks.

Figures 10, 11:
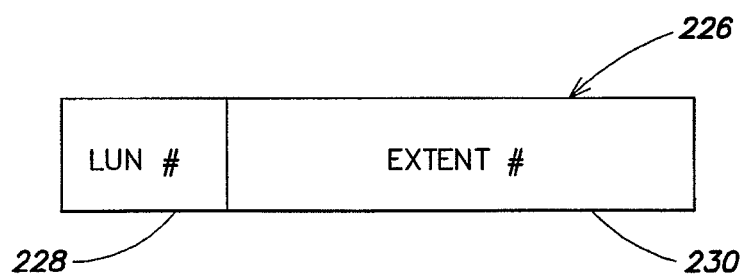
FIG. 10 is a visual representation depicting one example of an extent table according to aspects of the invention.
FIG. 11 is a visual representation depicting one example of an extent pointer according to aspects of the invention.

Referring to FIGS. 6 and 7, the tape blocks 194 of the virtual cartridge 192 are grouped into extent blocks 220. Each extent block is written, by FS 172, to an extent on one of the LUNS 184. An extent table is used to map the storage of each virtual cartridge to a location on the LUNS 184. One example of an extent table 222 is illustrated in FIG. 10. The extent table 222 contains a filename 224 which specifies the virtual cartridge to which the extent table belongs and a plurality of extent pointers 226. The format of an extent pointer is illustrated in FIG. 11. The extent pointer 226 includes a first field 228 that contains information specifying on which LUN the data is stored, and a second field 230 that contains which extent on that LUN contains the data. Thus, referring to FIGS. 6, 7, and 10, a first extent block 220 of data on virtual cartridge 192 may be stored on LUN0, extent0, as indicated by extent pointer 226. Referring to FIG. 6, the extent table 222 is stored in a preallocated portion of the LUNS referred to herein as the superblock 188.

In one embodiment, extent allocation may be performed in a "round robin" fashion, such that a first extent block of data may be stored on LUN0, extent0, a second extent block of data may be stored on LUN1, extent0, a third extent block of data may be stored on LUN2, extent0, a fourth extent block of data may be stored on LUN0, extent1, etc., as illustrated in FIG. 10. In this manner, disk I/O may be spread across the LUNS in the back-up storage system which may be preferable in terms of prolonging disk life, as well as performance. In addition, FS 172 may allocate extents as needed, rather than preallocating disk space into extents. Therefore, new disks may be easily added to the back-up storage system because FS 172 will locate and begin to use new disks as they are added without disrupting pre-existing storage data because only the extents in actual use are allocated.

In one embodiment, the file descriptor 218 may be allocated the first two MB of each virtual cartridge. Thus, this information may be stored at the beginning of each virtual cartridge (or storage system file) and may be located in the first extent to which the virtual cartridge is allocated. The file descriptors 218 form a searchable pool of metadata referred to herein as the logical metadata cache which is accessible and managed by VTape and VCartridge. The logical metadata cache contains the information that maintains the relationship between the backed-up files and the virtual cartridges and allows the controller to have random (as opposed to sequential) access to any file stored on back-up storage media 126. The file descriptor 218 contains information that maintains the relationship between backed-up files and their location in the blocks 204. For example, referring to FIGS. 7-9, a backed-up file F1 may be easily located on the back-up storage system because file descriptor contains information that lets the system software know that F1 is the first file in block B1 and VCartridge knows that block B1 is on virtual cartridge 192. Tdir contains information specifying the exact location of B1 on virtual cartridge 192, namely one block after file marker 207. Thus, the metadata and Tdir stored in the file descriptors enables fast, efficient and random access to individual files without the need to scan through sequential data to find a particular file.

In summary, the software of the back-up storage system maintains linked data entries that relate the backed-up files to their storage location on the disks that are the back-up storage media 126 and to the virtual cartridges using the extent tables, Tdir and the file descriptors. In this manner, backed-up files are received in tape format from the back-up/restore application and metadata is extracted and stored to link each backed-up file to a virtual cartridge while the files are in fact backed-up in random-access format to the disk arrays making up back-up storage media 126. A series of linked pointers contains the relational information that allows reconstruction of the virtual cartridges, and searchable metadata allows random access to individual backed-up files. The backed-up files can be considered to be stored in storage system files which are a plurality of extent blocks and which may correspond to virtual cartridges, or may include multiple virtual cartridges. The relationship between the backed-up data files and the virtual cartridges is always maintained and it therefore is irrelevant how the backed-up files are allocated into extents and system files and this process may be optimized for storage efficiency and convenience.

Referring again to FIG. 4, as discussed above, the storage system 116 may include a synthetic full back-up software application 166. In one embodiment, the host computer 118 backs-up data onto the emulated media 128, forming one or more virtual cartridges. In some computing environments, a "full back-up," i.e., a back-up copy of all data stored on the primary storage system in the network (see FIG. 1), may be accomplished periodically (e.g., weekly). This process is typically very lengthy due the large amount of data that is to be copied. Therefore, in many computing environments, additional back-ups, termed incremental back-ups, may be performed between consecutive full back-ups, e.g., daily. An incremental back-up is a process whereby only data that has changed since the last back-up was executed (whether incremental or full) is backed-up. Typically, this changed data is backed-up on a file basis, even though frequently much of the data in the file has not changed. Thus, incremental back-ups are typically much smaller, and therefore much faster to accomplish, than are full back-ups. It is to be appreciated that although many environments typically execute full back-ups once a week and incremental back-ups daily during the week, there is no requirement that such time frames are used. For example, certain environments may require incremental back-ups several times a day. The principles of the invention apply to any environment using full back-ups (and optionally incremental back-ups), regardless of how often they are executed.

During a full back-up procedure, the host computer may create one or more virtual cartridges containing the backed-up data that comprises a plurality of data files. For clarity, the following discussion will assume that the full back-up generates only one virtual cartridge. However, it is to be appreciated that a full back-up may generate more than one virtual cartridge, and that the principles of the invention apply to any number of virtual cartridges.

According to one embodiment, there is provided a method for creating a synthetic full back-up data set from one existing full back-up data set and one or more incremental back-up data sets. This method may obviate the need to perform periodic (e.g., weekly) full back-ups, thereby saving the user considerable time and network resources. Furthermore, as known to those of skill in the art, restoring data based on a full back-up and one or more incremental back-ups can be a time consuming process because, for example, if the most recent version of a file exists in an incremental back-up, the back-up/restore application will typically restore the file based on the last full back-up and then apply any changes from the incremental back-ups. Providing a synthetic full back-up, therefore, may have an additional advantage of allowing the back-up restore application to more quickly restore files based on the synthetic full back-up alone, without the need to perform multiple restores from a full back-up and one or more incremental back-ups. It is to be appreciated that the phrase "most recent version" as used herein refers generally to the most recent copy of a file (i.e., the most recent time that the file was saved), whether or not the file has a new version number. The term "version" is used generally herein to refer to copies of the same file which may be modified in some way or may have been saved multiple times.

Figure 12:
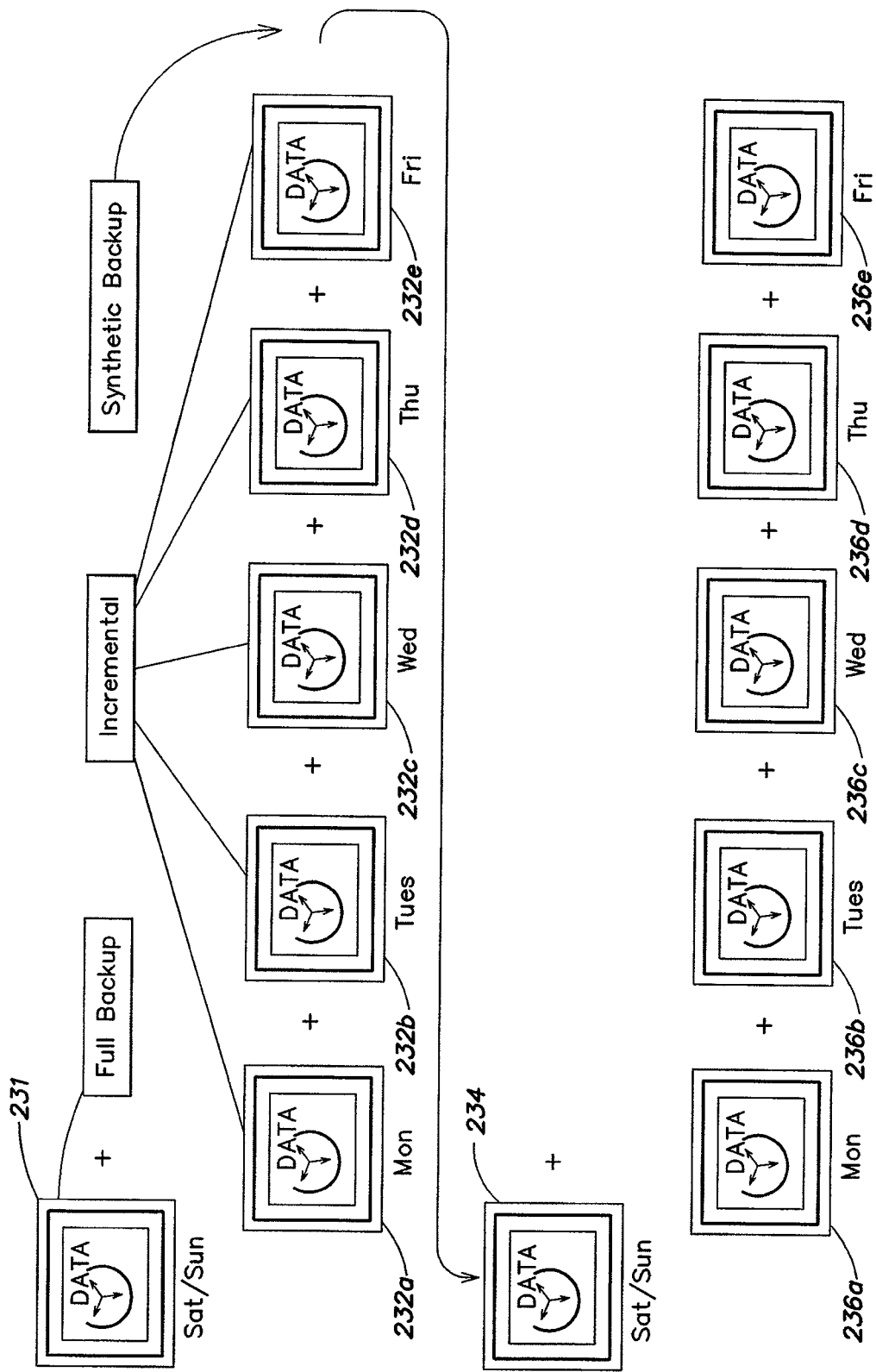
FIG. 12 is a visual representation depicting one example of a method of creating a synthetic full back-up according to aspects of the invention.

Referring to FIG. 12, there is illustrated a schematic representation of a synthetic full back-up procedure. The host computer 118 may execute a full back-up 231 at a first moment in time, for example, on a weekend. The host computer 118 may then execute subsequent incremental back-ups 232a, 232b, 232c, 232d, 232e, for example, on each day during the week. The storage system 116 may then create a synthetic full back-up data set 234, as discussed below.

According to one embodiment, the storage system 116 may include a software application referred to herein as a synthetic full back-up application 240 (see FIG. 3). The synthetic full back-up application 166 may be run on the storage system controller 136 (see FIG. 3) or may be run on the host computer 118. The synthetic full back-up application includes software commands and interfaces necessary for creating the synthetic full back-up data set 234. In one example, the synthetic full back-up application may perform a logical merge of metadata representations of each of the full back-up data set 231 and the incremental back-up data sets 232 to generate a new virtual cartridge that contains the synthetic full back-up data set 234.

Figure 13:
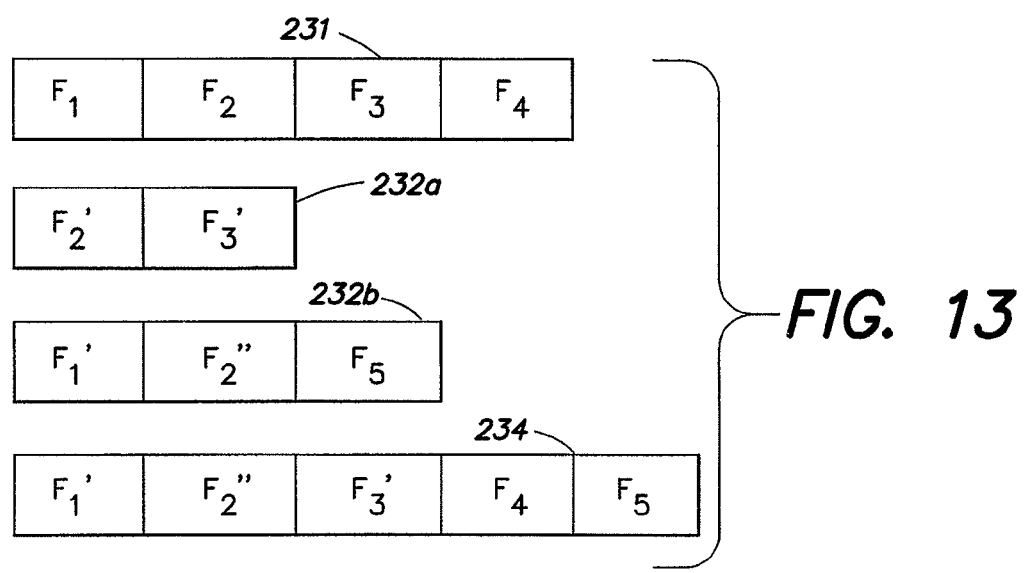
FIG. 13 is a visual representation depicting one example of a series of back-up data sets including a synthetic full back-up according to aspects of the invention.

For example, referring to FIG. 13, the existing full back-up data set may include backed-up files F1, F2, F3 and F4. A first incremental back-up data set 232a may include backed-up files F2', a modified version of F2, and F3', a modified version of F3. A second incremental back-up data set 232b may include backed-up files F1', a modified version of F1, and F2", a further modified version of F2, and a new backed-up file F5. Therefore, the synthetic full back-up data set 234 formed from a logical merge of the full back-up data set 231 and the two incremental data sets 232a and 232b, contains the latest version of each of the backed-up files F1, F2, F3, F4 and F5.

As seen in FIG. 13, the synthetic full back-up data set therefore contains backed-up files F1', F2", F3', F4 and F5.

As discussed above, back-up storage system software may create a logical metadata cache 134 that contains metadata relating to each backed-up file stored on the emulated media 128. In one example, the logical metadata cache 134 can be implemented as a database. Where the metadata is stored in a database, conventional database commands (e.g., SQL commands) can be used to perform the logical merge of the full back-up data set and the one or more incremental back-up data sets to create the synthetic full back-up data set.

Figure 14:
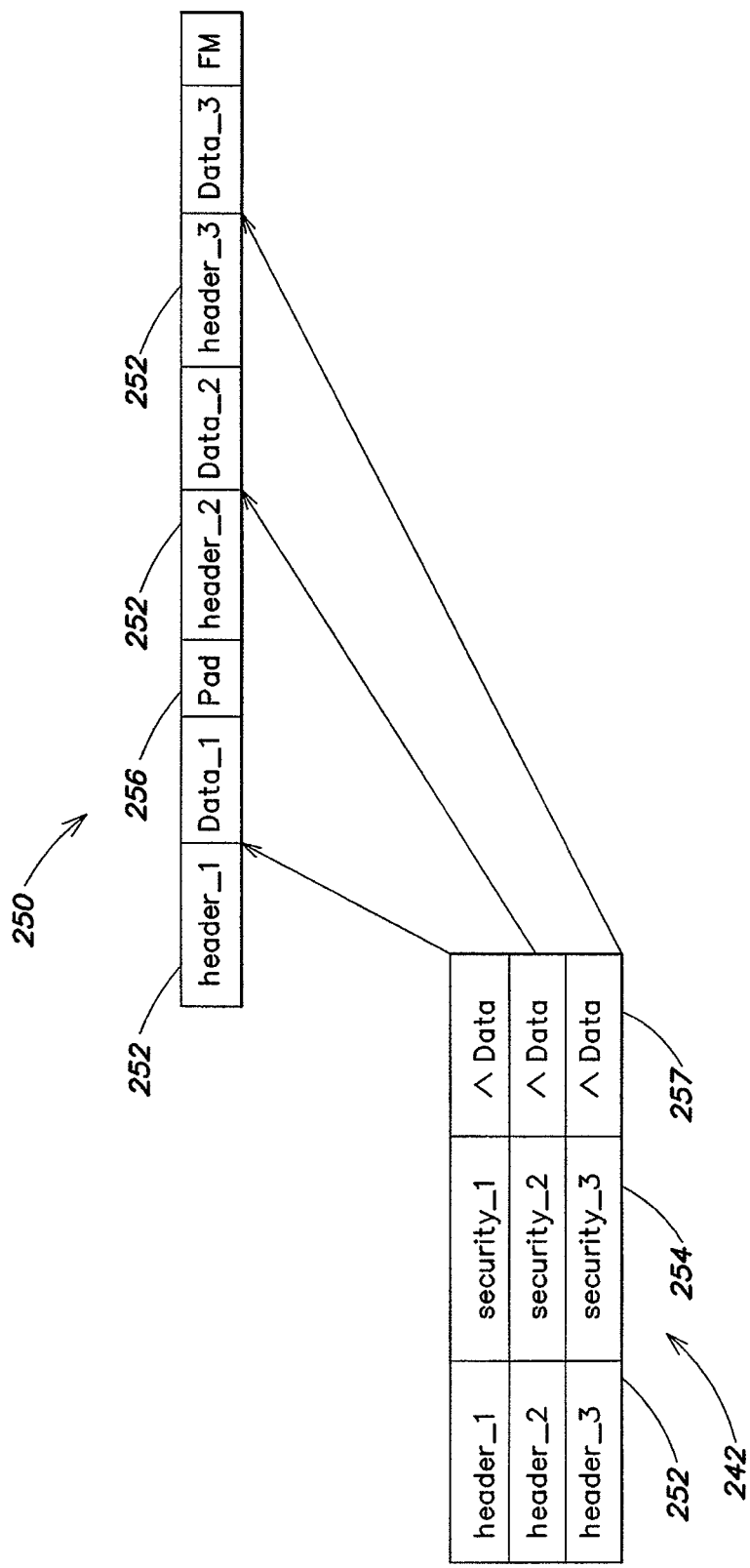
FIG. 14 is a visual representation of one example of a metadata cache structure.

As discussed above, the file descriptors (and other metadata) stored in the logical metadata cache contain information relating to the each backed-up file, including a location of the file on the back-up storage media 126. In one embodiment, the back-up/restore application running on the host computer 118 stores data in a streaming tape format (virtual cartridges) on the emulated media 128. An example of a system file data structure 250 representing this tape format is illustrated in FIG. 14. As discussed above, the system file data structure includes headers which may contain information about the backed-up file(s), such as the file descriptor for the backed-up files, the dates of creation and/or modification of the files, security information, the directory structure of the host system from whence the file(s) came, as well as other information linking the files to a virtual cartridge. These headers 252 are associated with the data which is actual user and system files that have been backed-up (copied) from the host computer, the primary storage system, etc. The system file data structure may also optionally include pads 256 which may appropriately align the next header to a block boundary.

As discussed above, in one embodiment, the header data is located in the logical metadata cache 134 to permit rapid searching and random access to the otherwise sequential tape data format. The use of the logical metadata cache, implemented using the SC-FS, SC-Cartridge and SC-Tdir, for example, on the storage system controller 136, allows translation of the linear, sequential tape data format, stored on the emulated media 128, into the random-access data format stored on physical disks making up the back-up storage media 126, as discussed above. The logical metadata cache 242 stores the headers 252 which include the file descriptors for the data files, security information which may be used to control access to the data files, as is discussed in more detail below, and pointers 257 to the actual locations of the data files on the virtual cartridges and the back-up storage media 126. In one embodiment, the logical metadata cache stores data relating to all the data files backed-up in the full back-up data set 231 and each of the incremental data sets 232.

According to one embodiment, the synthetic full back-up application software 166 uses the information stored in the logical metadata cache to create a synthetic full back-up data set. This synthetic full back-up data set is then linked to a synthetic virtual cartridge, created by the synthetic full back-up application 166. To the back-up/restore application, the synthetic full back-up data set appears to be stored on this synthetic virtual cartridge. As discussed above, the synthetic full back-up data set may be created by performing a logical merge of the existing full back-up data set and the incremental back-up data sets. This logical merge may include comparing each of the data files included in each of the existing full back-up data set and the incremental back-up data sets and creating a composite of the latest-modified version of each user file, as discussed above in reference to FIG. 13.

Figure 15:
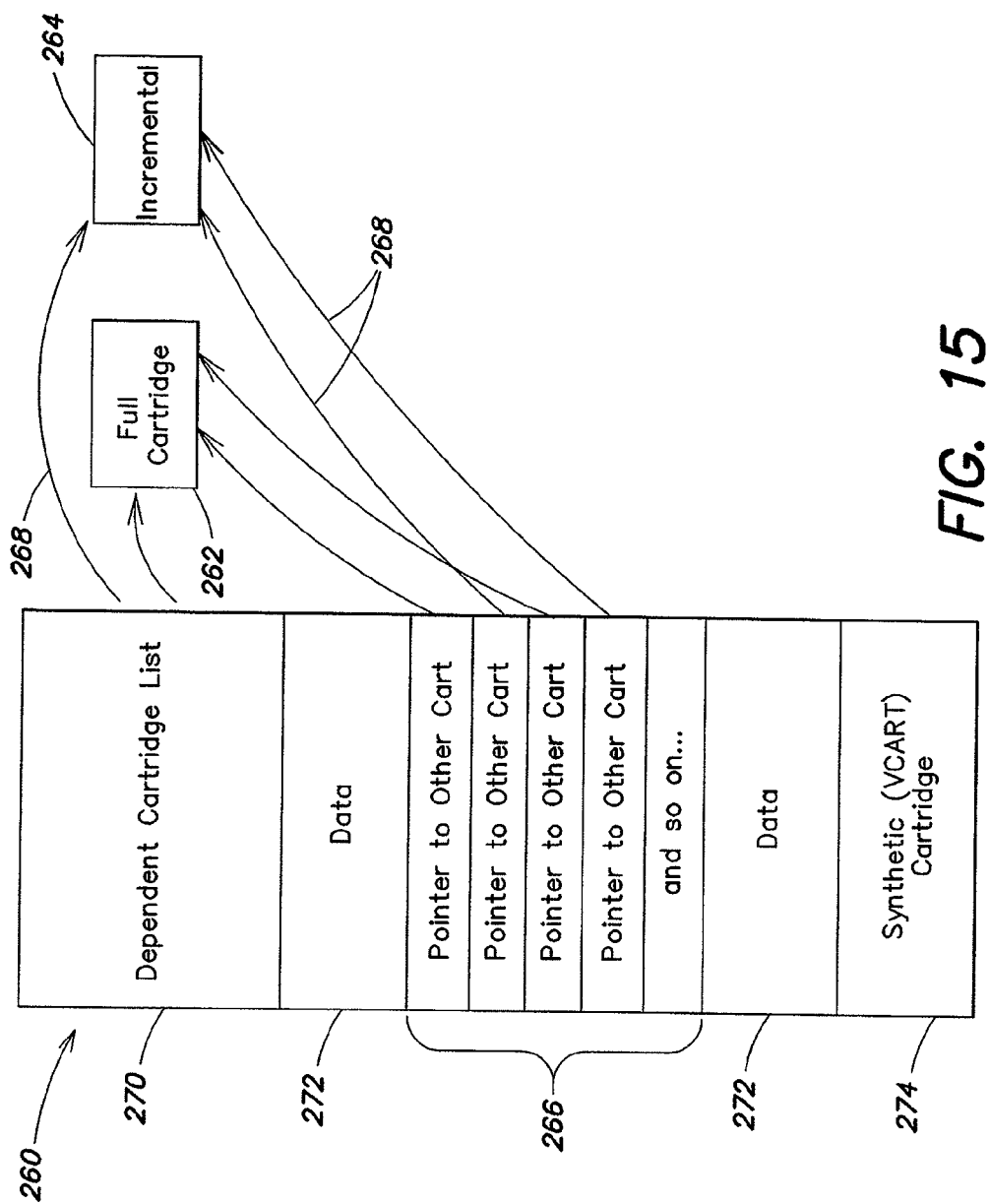
FIG. 15 is a visual representation of one example of a virtual cartridge storing a synthetic full back-up data set.
Figure 16:
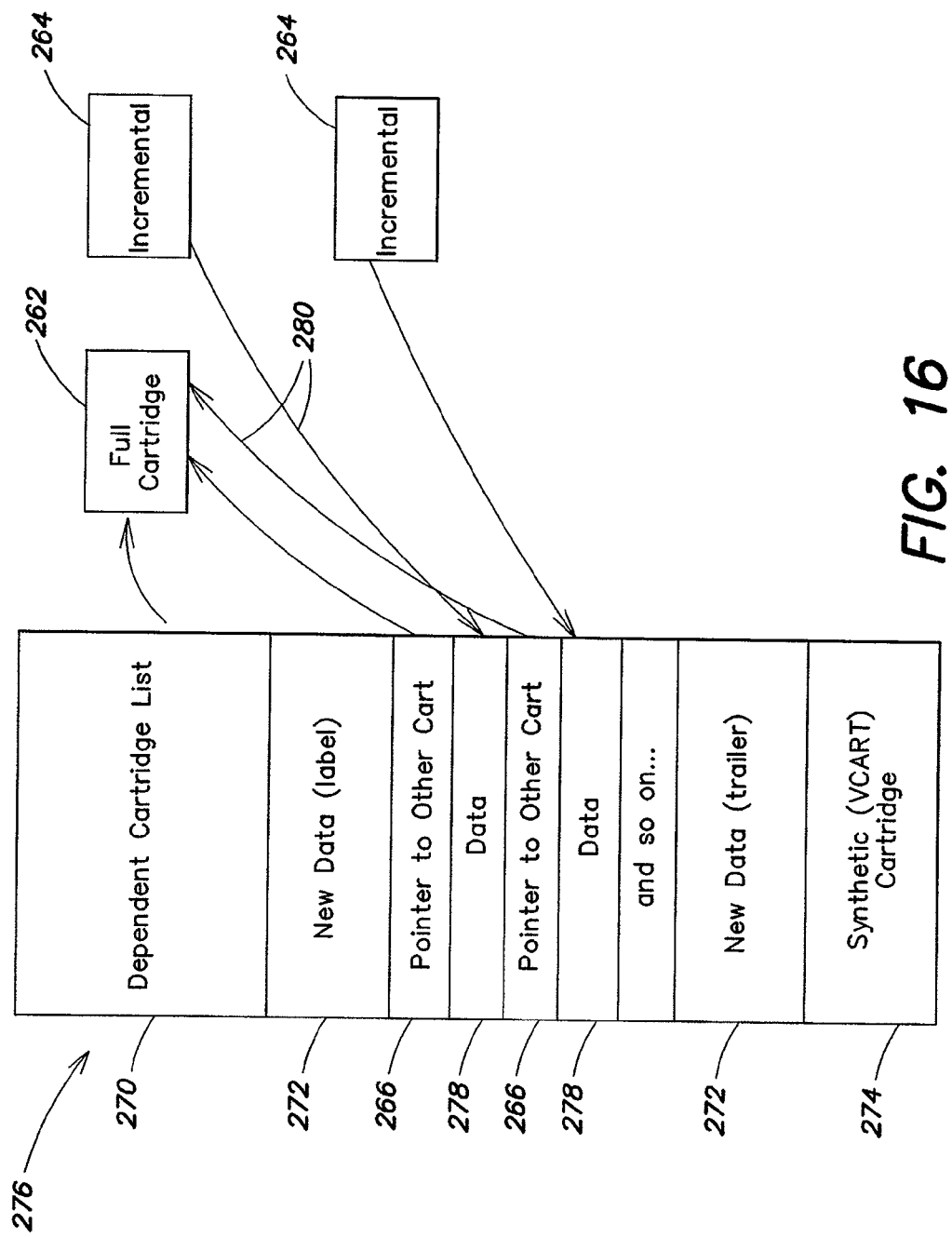
FIG. 16 is a visual representation of another example of a virtual cartridge storing a synthetic full back-up data set.

According to one embodiment, the synthetic virtual cartridge 260 includes pointers that point to locations of data files on other virtual cartridges, specifically, the virtual cartridges that contain the existing full back-up data set and the incremental back-up data sets, as shown in FIG. 15. Considering the example given with respect to FIG. 13 above, the synthetic virtual cartridge 260 includes pointers 266 that point (indicated by arrows 268) to the locations in the existing full back-up data set, on virtual cartridge 262, of user file F4 (because the existing full back-up data set contained the latest version of F4) and to the location of, for example, user file F3' in incremental data set 232a on virtual cartridge 264.

The synthetic virtual cartridge also includes a list 270 that contains the identifying numbers (and optionally the names) of all the virtual cartridges that contain data to which the pointers 266 point. This dependent cartridge list 270 may be important for keeping track of where the actual data is and for preventing the dependent virtual cartridges from being erased. In this embodiment, the synthetic full back-up data set does not contain any actual backed-up files, but rather a set of pointers that indicate the locations of the backed-up files on the back-up storage media 126. Therefore, it may be desirable to prevent the actual backed-up files (stored on other virtual cartridges) from being deleted. This may be accomplished in part by keeping a record (dependent cartridge list 270) of the virtual cartridges that contain the data and protecting each of those virtual cartridges from being over-written or deleted. The synthetic virtual cartridge may also include cartridge data 272 such as, the size of the synthetic virtual cartridge, its location on the back-up storage media 126, etc. In addition, the synthetic virtual cartridge may have an identifying number and/or name 274.

According to another embodiment, the synthetic virtual cartridge may include a combination of pointers and actual stored backed-up files. Referring to FIG. 11, in one example, the synthetic virtual cartridge includes pointers 266 that point to locations of data files (the latest versions, as discussed above in reference to FIG. 9) in the existing full back-up data set 230 on virtual cartridge 262. The synthetic virtual cartridge may also include data 278 containing actual data files copied from the incremental data sets 232, as indicated by arrows 280. In this manner, the incremental back-up data sets can be deleted after the synthetic full back-up data set 276 has been created, thereby saving storage space. The synthetic virtual cartridges are relatively small as they contain all or partly pointers rather than copies of all the user files.

It is to be appreciated that synthetic full back-ups may include any combination of pointers and stored file data and are not limited to the examples given above. For example, synthetic full back-ups may include pointers to data files for some files stored on certain incremental and/or full back-ups and may include stored file data copied from other existing full and/or incremental back-ups. Alternatively still, a synthetic full back-up may be created based upon a prior full back-up and any relevant incremental back-ups that does not include any pointers, but rather includes the latest version of actual file data copied from the appropriate full and/or incremental back-ups.

In one embodiment, the synthetic full back-up application software may include a differencing algorithm that enables it to compare the user and system file metadata for each of the existing full back-up data set and the incremental back-up data sets to determine where the latest version of each of the data files is located. For example, a differencing algorithm could be used to compare the dates of creation and/or modification, the version number (if applicable), etc. between different versions of the same data files in the different back-up sets to select the most recent version of the data file. However, users may often open a user file and save the file (thereby changing its data of modification) without actually changing any of the data inside the file. Therefore, the system may implement a more advanced differencing algorithm that may analyze the data inside the system or user files to determine whether the data has in fact changed. Variations of such differencing algorithms and other types of compare algorithms may be known to those skilled in the art. In addition, as discussed above, where the metadata is stored in a database format, database commands such as SQL commands can also be used to perform the logical merge. The invention may apply any of such algorithms to ensure that the most recent or latest version of each user file may be selected from all compared existing back-up sets so as to properly create the synthetic full back-up data set.

As should be appreciated by those skilled in the art, the synthetic full back-up application enables full back-up data sets to be created and made available without requiring the host computer to execute a physical full back-up. Not only does this avoid burdening the host computer with the processor overhead of transferring the data to the back-up storage system, but in embodiments where the synthetic full back-up application is executed on the storage system, it significantly reduces the utilization of network bandwidth. As illustrated in FIG. 12, further synthetic full back-up data sets may be created using a first synthetic full back-up data set 234 and subsequent incremental back-up data sets 236. This may provide a significant time advantage in that files or objects that are not frequently modified may not be frequently copied. Instead, the synthetic full back-up data sets may maintain pointers to these files that have just been copied once.

As discussed above in reference to FIG. 4, the storage system may also include a software application referred to as the end-user restore application 170. Thus, according to another embodiment, there is provided a method for end users to locate and restore back-up data without IT staff intervention and without requiring any changes to existing back-up/restore procedures and/or policies. In a typical back-up storage system, the back-up/restore application running on the host computer 118 is controlled by IT staff and it may be impossible or very difficult for an end-user to access backed-up data without intervention by the IT staff. According to aspects and embodiments of the invention, storage system software is provided that allows end users to locate and restore their files via, for example, a web-based or other interface with the back-up storage media 126.

It is to be appreciated that, as with the synthetic full back-up application 166, the end-user restore application 170 may be run on the storage system controller 136 (see FIG. 3) or may be run on the host computer 118. The end-user restore application includes software commands and interfaces necessary to allow an authorized user to search the logical metadata cache to locate, an optionally restore, backed-up files from the back-up storage media 126.

According to one embodiment, there is provided software including a user interface that is installed and/or executed on the user computer 122. The user interface may be any type of interface that allows a user to locate files on the back-up storage media. For example, the user interface may be a graphical user interface, may be web-based, or may be a text interface. The user computer is coupled to the storage system 116 via a network connection 124 which may be, for example, an Ethernet connection. Through this network connection 124, an operator of the user computer 122 can access the data stored on the storage system 116.

In one example, the end-user restore application 170 includes a user authentication and/or authorization feature. For example, a user may be asked to login via the user interface on the user computer using a username and password.

The user computer may communicate the username and password to the storage system (e.g., to the end-user restore application) which may use an appropriate user authentication mechanism to determine whether the user has access to the storage system. Some examples of user authentication mechanisms that may be used include, but are not limited to, a MICROSOFT Active Directory server, a UNIX "yellow pages" server or a Lightweight Directory Access Protocol. The login/user authentication mechanism may communicate with the end-user restore application to exchange the user privileges. For example, some users may be allowed to search only those files that have been created by them or for which they have certain privileges or are identified as an owner. Other users such as, for example, system operators or administrators may be allowed access to all backed-up files, etc.

According to one embodiment, the end-user restore application uses the logical metadata cache to obtain information about all the data files backed-up on the back-up storage media. The end-user restore application presents to the user, via the user interface, a hierarchical directory structure of the user's files sorted by, for example, back-up time/date, username, original user computer directory structure (that may have been obtained when the files were backed-up), or other file characteristics. In one example, the directory structure presented to the user may vary according to the privileges enabled for that user. The end-user restore application may accept browse requests (i.e., through the user interface, the user may browse the directory structure to locate a desired file) or the user may search for a file by name, date, etc.

According to one embodiment, the user may restore backed-up files from the storage system. For example, once the user has located a desired file, as described above, the user may download the file from the storage system via the network connection 124. In one example, this download procedure may be implemented in a manner comparable to any web-based download, as known to those skilled in the art.

By allowing end users to access those files for which they have permission to view/download, and by enabling such access through a user interface (e.g., web-based technology), the end-user restore application can enable user to search for and restore their own files without there being any need to alter any back-up policies or procedures.

According to another embodiment, there is provided a mechanism and methods whereby users can "mount" a network attached view of the back-up data sets that are stored on the back-up storage media 126. This may allow users to view and access data in the mounted data set(s) as they would data on any other local or network drive coupled to their computer. Thus, for example, a user may restore data availability to an application server (e.g., if the system's primary storage 106 (see FIG. 1) has suffered a fault) without having to execute a restore process through the media server 114 (see FIG. 1). The restoration of data to the application server using a mounting procedure as described herein may be many orders of magnitude faster than a typical media server facilitated volume restore. It is to be appreciated that the term "mount" as used herein refers to making a data volume or a network component, such as a network drive, available to the operating system of a host computer. The data volume may include, for example, a single data file or system file, a plurality of files, or a directory structure that may include a plurality of files. Common mounting protocols include NFS (network file system) or CIFS (common Internet file system) sharing. These protocols allow a host computer to access resources on another computer over a network connection via an interface that makes it appear as those the remote resources were locally present on the host computer.

Figure 17:
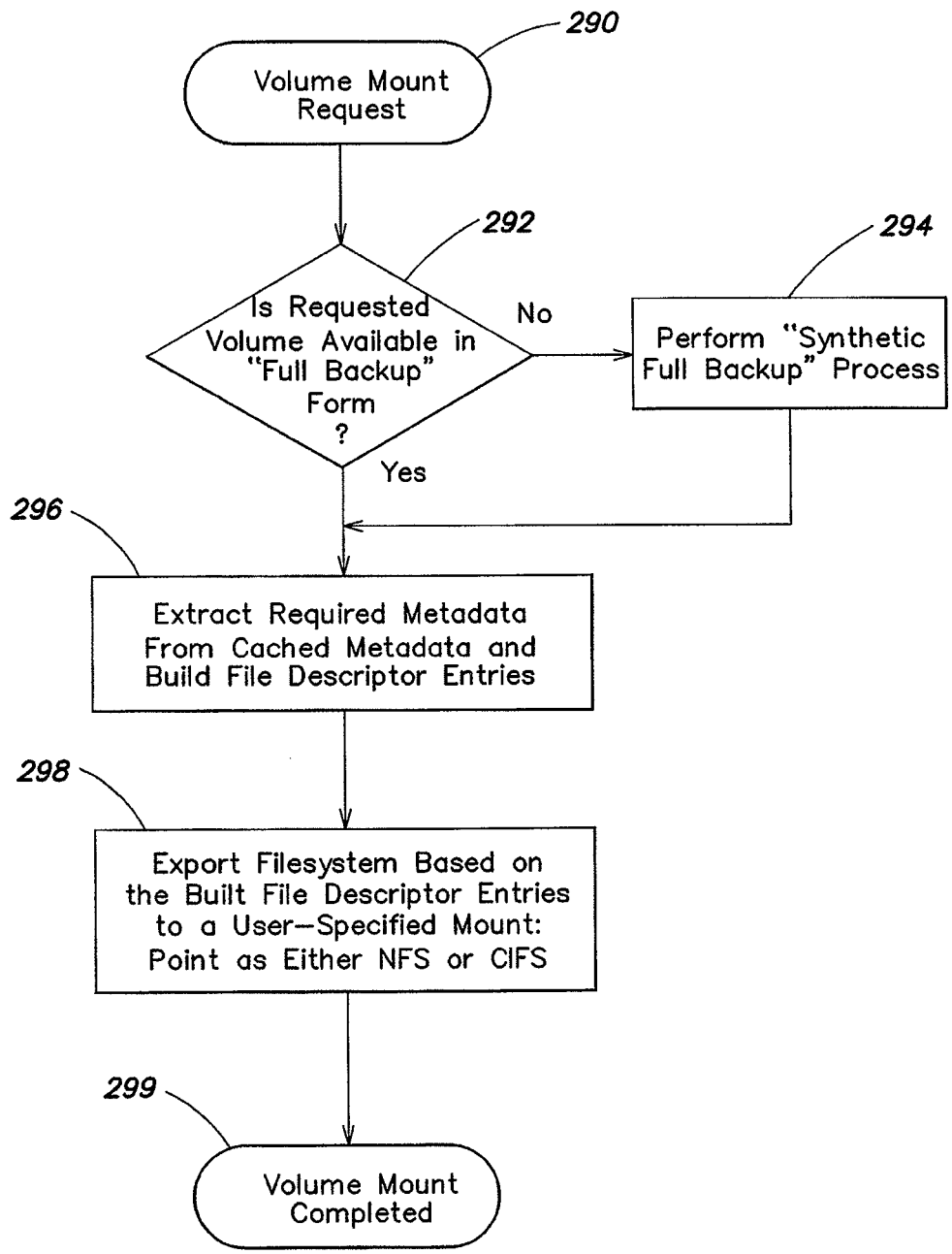
FIG. 17 is a flow diagram of one embodiment of a method for restoring data from the back-up storage system, according to aspects of the invention.

Referring to FIG. 17, there is illustrated a flow chart representing one embodiment of a method for performing a volume mount according to aspects of the invention. In a first step 290, a user selects a data volume to mount and sends a volume mount request to the back-up storage system controller 136 (see FIG. 3). Typically, a user may want to restore data from a full back-up data set (rather than an incremental back-up data set) so as to capture a full and accurate representation of the backed-up information. If a current full back-up data set does not exist, (for example, a network manager may execute weekly full back-ups and thus if the user wishes to restore data during the week, a current full back-up may not be available), a synthetic full back-up may be created (as described above) and used to restore selected data.

According to one embodiment, the back-up storage system 116 may include a software application, referred to herein a volume restore application 168 (see FIG. 4), that may control and implement methods for performing a data volume mount and restore procedure. The volume restore application 168, similar to the synthetic full back-up and end-user restore applications, may be executed on the host computers and/or user computers and portions thereof may be distributed across all or some of the storage system controller, the host computer(s), and the user computer(s).

Referring again to FIG. 17, after a volume mount is requested, the volume restore application may query whether a current full back-up data set is available (step 292). If not, the volume restore application may communicate with the synthetic full back-up application 166 (see FIG. 4) to perform the synthetic full back-up process and create a current back-up data set (step 294). The volume restore application may export either a regular full back-up data set or synthetic full back-up data set to perform the requested volume mount as either an NFS or CIFS share. Specifically, the volume restore application queries the logical metadata cache 242 to locate the appropriate metadata that represents the selected full back-up volume identified in step 290.

Figure 18:
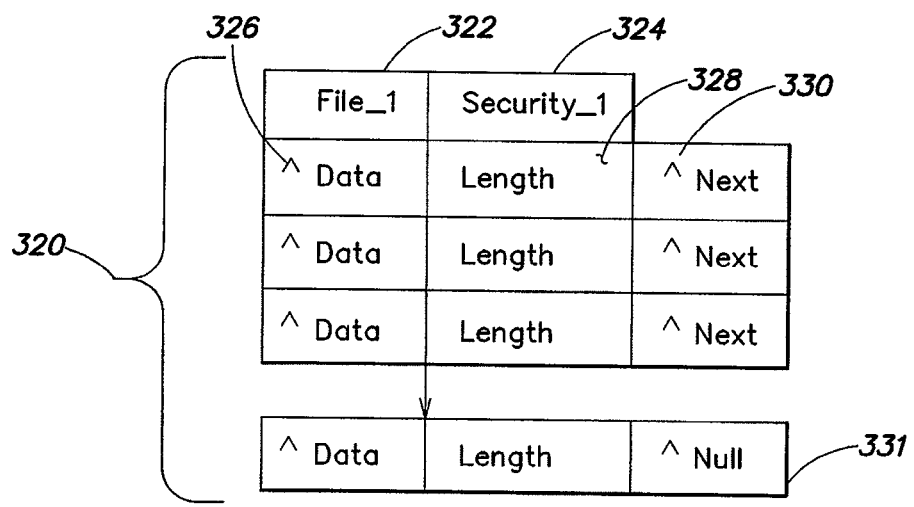
FIG. 18 is a visual representation of one example of a file descriptor structure according to aspects of the invention.

According to one embodiment, the mount request (step 290) may cause the volume restore application to build one or more file descriptor structures to facilitate exporting the volume for mounting as an NFS or CIFS share (step 296). Referring to FIG. 18, there is illustrated one embodiment of a file descriptor structure 320 that may be built by the volume restore application, the file descriptor 320 corresponding to a system file in tape format (e.g., system file 332—see FIG. 19). As discussed above, a file descriptor contains searchable metadata corresponding to backed-up files stored on the back-up storage system. The file descriptor 320 may include a plurality of fields that contain information such as, for example, the filename 322 and file permissions (access control lists) 324 for the backed-up files contained in the volume to be mounted. In addition, the file descriptor contains one or more pointers 326 to the location of source data of a backed-up file (i.e., to identify where on the storage media 126 the data file is stored), the length 328 of that backed-up file, and a pointer 330 to the next entry (e.g., the next backed-up file) in the linked-list file descriptor structure. If the "next" field is null, e.g., as indicated by reference numeral 331, then it represents that the data file is the last data file known to the system file represented by the file descriptor 320 (e.g., is the last linked-list entry. Each system file that is contained in the data volume to be mounted will be represented by a file descriptor structure such as that illustrated in FIG. 14. Once each system file in the requested volume has a file descriptor 320 built, the file descriptors may be used to locate and export the associated data files in response to an NFS or CIFS request.

Figure 19:
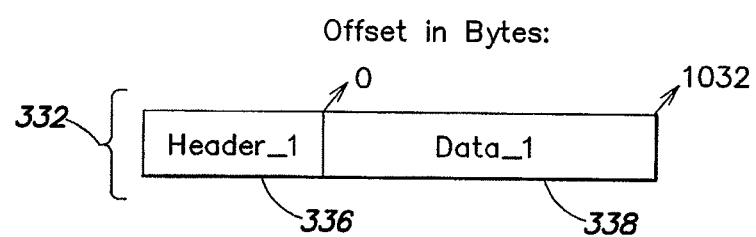
FIG. 19 is a visual representation illustrating one example of how file data may be stored in tape format.
Figure 20:
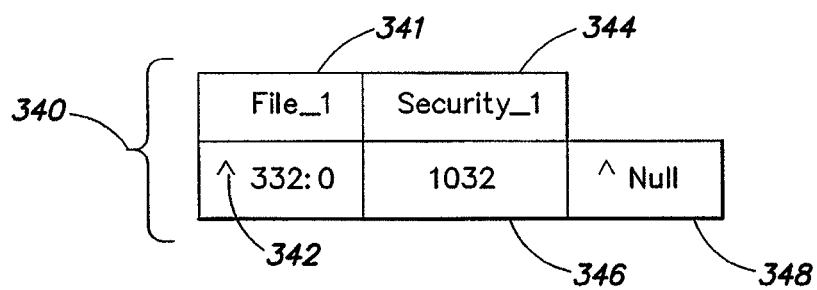
FIG. 20 is a visual representation illustrating a file descriptor for the file depicted in FIG. 19.

As discussed above, in one embodiment, the file descriptor may be implemented in accordance with a standardized format, such as the tape archive (tar) format used by most UNIX-based computer systems. An illustration of a typical system file 332 as it would be written in tape format (e.g., in tar format) is illustrated in FIG. 19 as a segment of a tape (e.g., tar) data stream. A corresponding file descriptor 340 for system file 332 is illustrated in FIG. 20. As illustrated in FIG. 19, a file written in tape format includes a header 336 and actual data 338 stored in the system file 332. The data 338 may correspond to one or more backed-up files. In the illustrated example, the system file 332 is 1032 bytes long, however it is to be appreciated that the file may have any length depending on the size of the file and the format in which it is written.

The file descriptor 340 for file 332 is contained in the header 336. As illustrated in FIG. 20 and in accordance with the general example given in FIG. 18, the file descriptor 340 contains a filename 341, security information 344, pointers 342 to the stored data of each backed-up file known to the system file, the length 346 of the corresponding backed-up file, and a "next" entry that identifies the next backed-up file known to the system file, which in the illustrated example is a null 348.

Referring again to FIG. 17, once all the file descriptors for the files in the data volume to mounted have been built, the volume restore application exports the file system based on the built file descriptors to a user-specified mount point as either an NFS or CIFS share (step 298). At this point, the mount is completed (step 299) and the mounted data volume is available for the user to read and/or write data, as discussed below.

According to one embodiment, NFS or CIFS read operations (i.e., the user wishes to view data in the mounted data volume) are serviced by searching through the file descriptors 320 for matching file specifications. It is to be appreciated that, according to one embodiment, the user need not actually search the file descriptors his or herself. Rather, the volume restore application may include a user interface that presents the data to the user in, for example, a typical directory structure format. The volume restore application may include software that translates user requests for specific files into search commands that access the logical metadata cache and search the file descriptors 320 for the matching system files. Once a file has been located, data transfer to the user computer may be accomplished by following the linked list (i.e., following the pointers stored in the file descriptor to locate the actual data) to build a buffer for the file data which may be sent to the requesting user.

According to another embodiment, a mechanism may be provided for the user to also write new data to the mounted volume. As discussed above, the mounted volume data may appear to the user as an ordinary network drive or other network-stored data. However, in fact the original mounted volume data is actually back-up data that typically needs to be preserved; at least until another back-up data set is created. Therefore, it may be undesirable to allow a user to actually modify the original back-up data. To avoid modifying the back-up data while still allowing the user modify data corresponding to the mounted volume, a mechanism is provided that (transparent to the user) diverts the write to other storage media, as discussed below.

Figure 21:
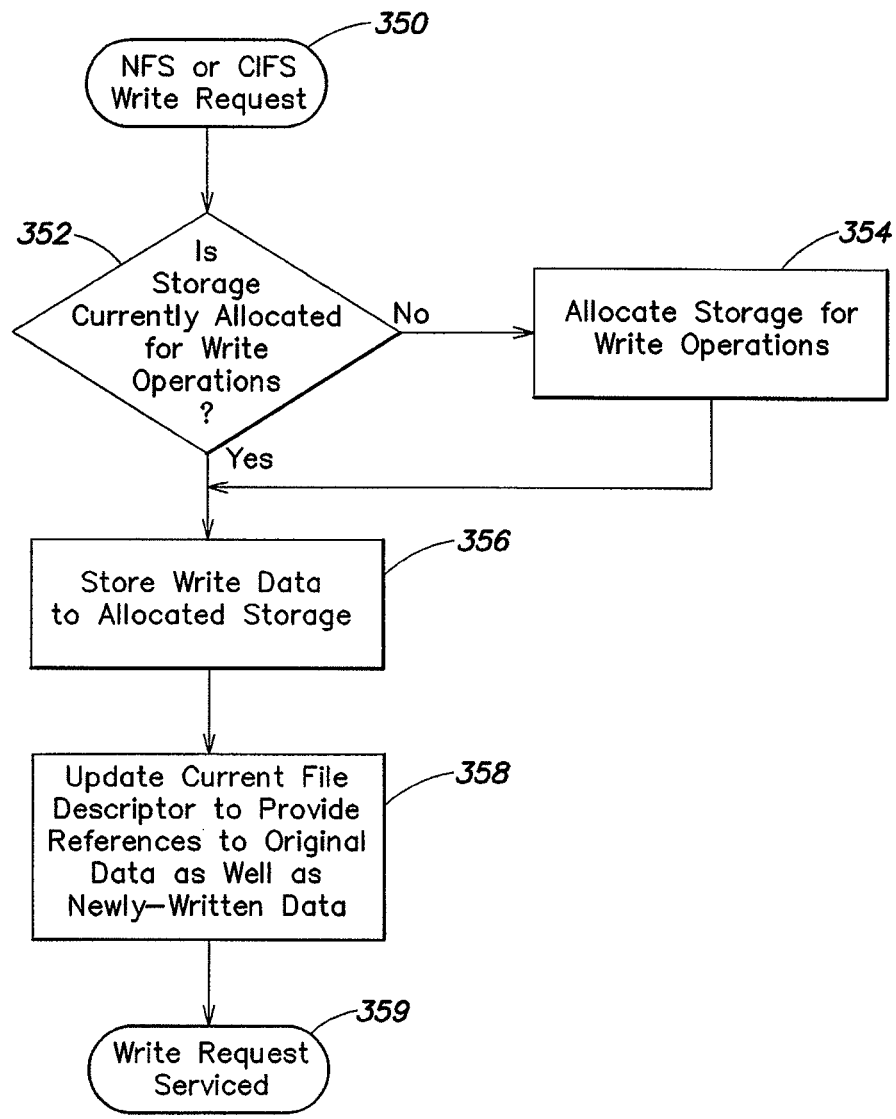
FIG. 21 is a flow diagram of a method of writing data to a mounted data volume in accordance with one embodiment of the present invention.

Referring to FIG. 21, there is illustrated a flow chart of one embodiment of a method of processing a write request according to aspects of the invention. In a first step 350, a user requests an NFS or CIFS write operation (typically by selecting a "save" option while editing or viewing a data file). The volume restore application then implements the write request by locating available storage space, writing the data to that space, and updating an appropriate file descriptor to reference the newly written data.

According to one embodiment, the volume restore application queries whether storage space has already been allocated for writing data (step 352) and, if not, allocates storage space (step 354). The storage space may be allocated on the back-up storage media 126 (see FIG. 4). The allocated storage space may be designated specifically to hold only the write data (and optionally, associated metadata).

Figure 22:
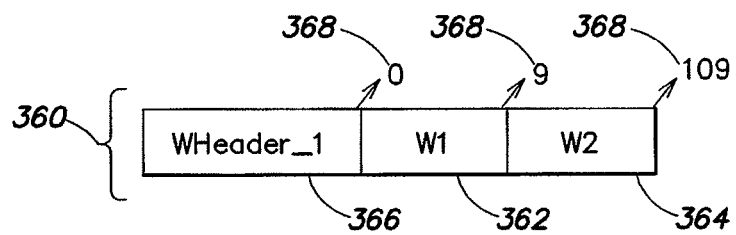
FIG. 22 is a visual representation of a newly written file.

Referring to FIG. 22, there is illustrated one example of NFS or CIFS write data as stored on the back-up storage media 126. The written data 360 includes, for example, two written portions, W1 362 and W2 364 that correspond to stored data arising as a result of write commands serviced by the volume restore application. For example, W1 and W2 may correspond to modified data files that are contained within the mounted data volume. It is to be appreciated that although the illustration corresponds to two write requests, the principles of the invention apply to any number of write requests, and the files may be suitably altered to reflect any appropriate number of write requests. The written data 360 also includes a header 366 that includes metadata forming a self-describing relationship between the original data (e.g., file 332) and the newly written data 360. Particularly, the header may include offset information that indicates where the written data portions W1 and W2 logically exist relative to the original data, as described further in relation to FIG. 23.

Figure 23:
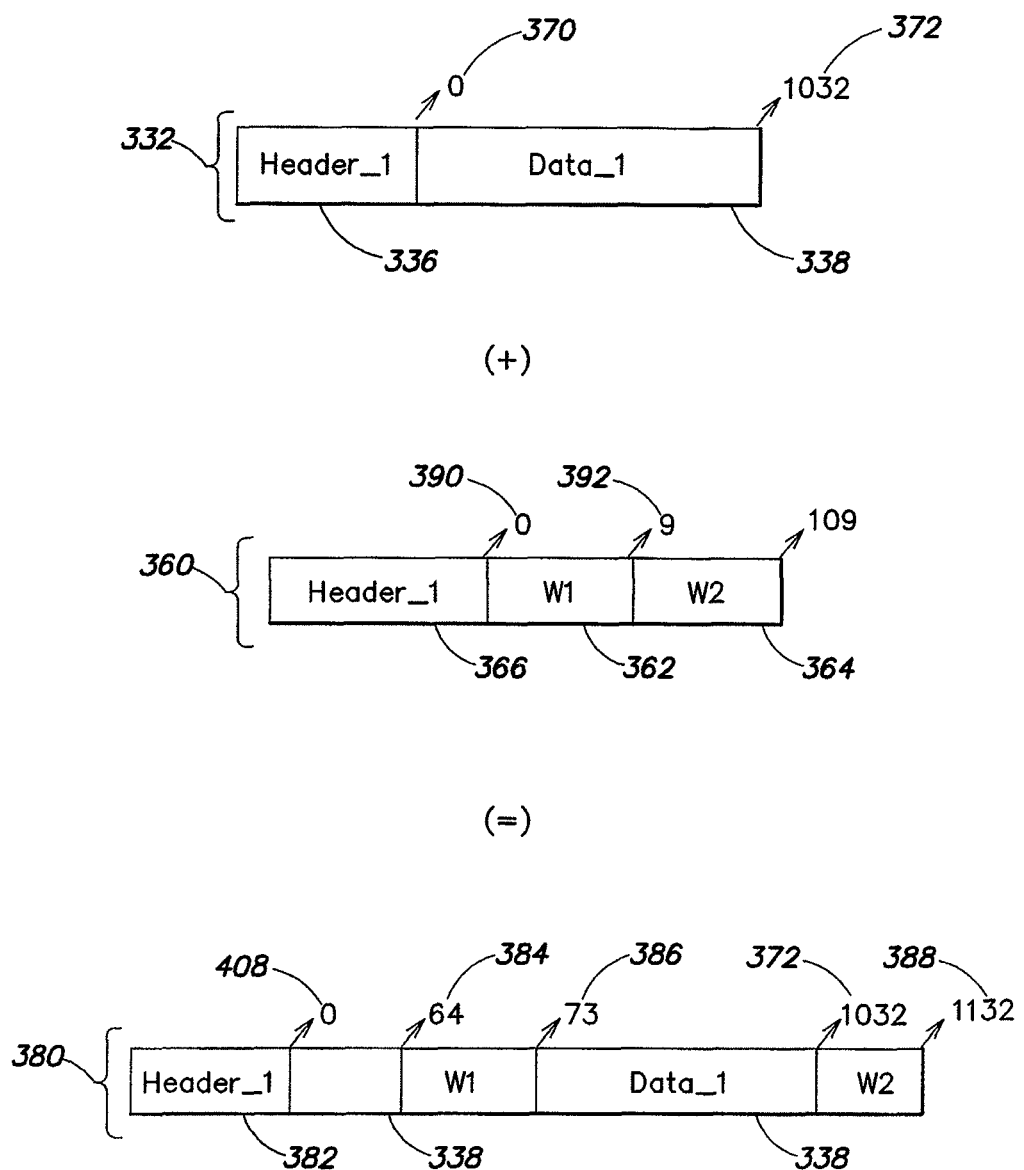
FIG. 23 is a visual representation of one example of a relationship between an original file, a newly written file, and a resulting modified file, according to aspects of the invention.

Referring to FIG. 23, there is illustrated one example of a system file layout after two write requests have been serviced. An original system file 332 is stored on the back-up storage media 126 (see FIG. 13) and presented to the user through the mounting procedure described above. The system file 332 as illustrated in FIG. 23 is in tape format and the data portion 338 may include a plurality of backed-up data files (e.g., user files). The data begins at offset zero bytes (point 370) and ends 1032 bytes later at point 372. The written file 360 corresponds to a user's requests to write data to file 332. For example, the user may have modified two data files contained within system file 332, resulting in a written file 360 including W1 and W2. As discussed above, this written file 360 may be stored separately from file 332 on the storage media so as not to alter the original back-up data. A logical modified system file 380 is illustrated and represents the file 332 including the changes (i.e., written files 360) that the user made through the write requests. In other words, in the modified system file 380, W1 and W2 (the user-modified data files) may be used to replace the original data files contained within the data portion of original system file 332 without destroying the backed-up data.

As shown in FIG. 23, the modified system file corresponds to a logical combination (summation) of original system file 332 and written file 360. As shown, the original system file data 338 begins at offset zero as in the original file. At offset 64 (represented by reference numeral 384), the first portion W1 of modified data begins, and ends nine bytes further along at offset 73 represented by reference numeral 386. Thus, W1, a user-modified data file resulting from a user write request, may be used to replace an original data file that was located offset 64 in the original system file 332. The length of W1 is shown to be 9 bytes because W1 exists from offset zero (390) in the written file 360 and ends at offset 9 (392) in the written file 360. The location of the beginning of W1 in the modified file (at offset 64 in the illustrated example) is determined by information stored in the header 366, namely the relative relationship between the written file 360 and the original file 332. The W2 portion is also included in the modified file 380, beginning at offset 1032 (the original end of the file, represented by reference numeral 372) and logically extending the file by 100 bytes. Again, the length of W2 is determined from information located in the header 366. The new end point of the file is represented by reference numeral 388.

It is to be appreciated that although the modified file 380 is logically created and represents the user-modified version of the original file, the newly written data, represented by file 360 is not actually stored as part of the original file 332. Rather, as discussed above, the newly written data is stored at a specific location on the storage media identified for write data. In this manner, the integrity of the original back-up data is maintained, while allowing the user to apparently write to the mounted volume as they would to an ordinary local or network drive.

Figure 24:
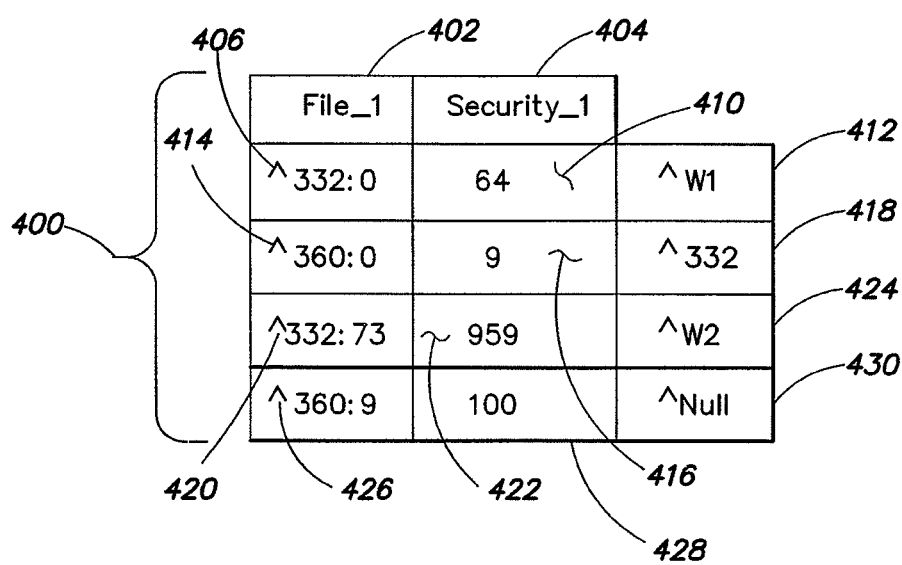
FIG. 24 is a visual representation of one example of a file descriptor representing the modified file of FIG. 23.

The modified file 380 includes a header 382 that includes a file descriptor that represents the modified file. Referring to FIG. 24, there is illustrated an example of such a file descriptor 400. The file descriptor 400 includes a name field 402 that identifies the filename of the modified file 380 and a security field 404 that identifies permission attributes of the modified file 380. The file descriptor 400 also includes a plurality of data fields that include pointers to the original file 332 and pointers to the written file 360 to capture the data stored in each of the original file and the written file. By sequentially following the linked list of pointers given in the file descriptor 400, a representation of the modified file 380 is given.

Referring to FIGS. 23 and 24, one specific example of a file descriptor for a modified file is illustrated and explained. In a first data field 406, there is located a pointer to a location of a first data file, in the modified file 380, which is at offset zero bytes, identified in FIG. 23 by reference numeral 408. The following field 410 indicates the length of the data file whose location is specified by pointer 406. In the illustrated example, the length is 64 bytes, as can be seen in FIG. 23 (the data extends between the zero offset point, reference numeral 408, and an offset of 64 bytes, represented by reference numeral 384). The next field 412 indicates that the next data file in modified file 380 is W1, as shown in FIG. 23. Thus, a pointer 414 indicates that the location of the data corresponding to W1 is stored in newly written file 360 at the zero offset point (reference numeral 390 in FIG. 23). The length field 416 indicates that the length of W1 is 9 bytes, which can also be seen by looking at FIG. 23—W1 extends between offset 64 (reference numeral 384) and offset 73 (reference numeral 386) in the modified file 380. The next field 418 indicates that the next data file in the modified file 380 is a data file from the original system file 332. A pointer in field 420 indicates that the next data file is located at offset 73 in the modified file 380, as shown by reference numeral 386 in FIG. 23. Field 422 indicates that the length of the data file is 959 bytes, which can also be seen by referring to FIG. 23. The next field 424 indicates that the following data file is W2. Again, a pointer in field 426 identifies the location of W2, namely newly written file 360 at offset 9, which can be seen by referring to FIG. 23. Field 428 indicates that the length of W2 is 100 bytes, and the next field 430 contains a null, indicating the W2 is the last data file in modified file 380, as is shown in FIG. 23. Thus, the file descriptor 400 contains a "roadmap" that identifies the structure of modified file 380 and the location(s) of the data that is contained in modified file 380.

The volume restore application and methods described above represent sequential tape-formatted data in a form suitable for random-access I/O systems such as NFS or CIFS. Linked list file descriptors, such as file descriptor 400, can be used to translate the sequential tape-formatted data into randomly accessible data by recording the locations on the storage media of each data file in a particular tar stream, for example, and also the locations of each data file in the tar stream relative to other data files in the tar stream. In addition, according to one embodiment, the volume restore application may include provisions for representing the changed (i.e., written) data back into a tape (e.g., tar) format so that a back-up/restore application may access the data in a usual manner as described above. According to one embodiment, the instant restore application includes a facility that generates a virtual cartridge which is appropriately formatted with tape headers, pads, data and file markers, in the manner described above in relation to the file system software. In another embodiment, the volume restore application may interface with the file system software to create virtual cartridges as discussed above that contain newly written and modified files.

It should be appreciated that although aspects of the present invention, such as the synthetic full back-up application, the end-user restore application, and the volume restore application are described herein primarily in terms of software, these and other aspects may alternatively be implemented in software, hardware or firmware, or any combination thereof. Thus, for example, embodiments of the present invention may comprise any computer-readable medium (e.g., a computer memory, a floppy disk, a compact disk, a tape, etc.) encoded with a computer program (i.e., a plurality of instructions), which, when executed, at least in part, on a processor of a storage system, performs the functions of the synthetic full back-up application and/or the end-user restore application as described in detail above.

In general summary, embodiments and aspects of the invention thus include a storage system and methods that emulate a conventional tape back-up system but may provide enhanced functionality such as being able to create synthetic back-ups and allowing end users to view and restore backed-up files. However, it should be appreciated that various aspects of the present invention may be used for other than the back-up of computer data. Because the storage system of the present invention may be used to economically store vast amounts of data, and that stored data can be accessed randomly, as opposed to sequentially, and at hard disk access times, embodiments of the present invention may find use outside of traditional back-up storage systems. For example, embodiments of the present invention may be used to store video or audio data representing a wide selection of movies and music and enable video and/or audio on demand.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method for maintaining data structures that emulate storage devices comprising:
receiving an instruction to delete backed-up data stored in a first data structure that emulates a first storage device;
determining whether a second data structure that emulates a second storage device also includes an identifier that identifies the backed-up data;
maintaining the backed-up data in response to a determination that the second data structure includes the identifier that identifies the backed-up data, wherein the identifier is indicative of the second data structure depending on the first data structure, wherein maintaining the backed-up data includes:
    storing the backed-up data in a third data structure that emulates a third storage device; and
    deleting the backed-up data from the first data structure.

2. The method according to claim 1, further comprising deleting the backed-up data if the second data structure does not include an identifier that identifies the backed-up data.

3. The method according to claim 1, wherein determining whether a second data structure includes an identifier that identifies the backed-up data comprises reviewing metadata identifying backed-up data stored in the second data structure.

4. The method according to claim 1, wherein the first data structure includes a first synthetic virtual cartridge, the second data structure includes a second synthetic virtual cartridge and the third data structure includes a third synthetic virtual cartridge.

5. A non-transitory computer-readable medium comprising:
    a first synthetic virtual cartridge that emulates a first sequential storage device, the first synthetic virtual cartridge being linked to a synthetic full back-up data set comprising a latest version of each backed-up file from a full back-up data set and one or more incremental back-up data sets, the first synthetic virtual cartridge having an allocated storage capacity and comprising:
        first backed-up data; and
        at least one identifier of second backed-up data stored in a second synthetic virtual cartridge that emulates a second sequential storage device, the second backed-up data comprising the full back-up data set or an incremental back-up data set from the one or more incremental back up data sets.

6. The non-transitory computer-readable medium of claim 5, wherein the storage capacity changes based on storage capacity used by the first backed-up data and the at least one identifier of second backed-up data.

7. The non-transitory computer-readable medium of claim 5, wherein the first sequential storage device is a tape and the second sequential storage device is another tape.

8. A method for maintaining metadata identifying first and second synthetic virtual cartridges, the second synthetic virtual cartridges including a backed-up file, the method comprising:
    storing an identifier of the backed-up file in the first synthetic virtual cartridges, the first synthetic virtual cartridge emulating a first sequential storage device, the first synthetic virtual cartridge being linked to a synthetic full back-up data set comprising a latest version of each backed-up file from a full back-up data set and one or more incremental back-up data sets; and
    storing, in the metadata, a record of dependency of the first synthetic virtual cartridge upon the second synthetic virtual cartridge, the second synthetic virtual cartridge emulating a second sequential storage device.

* * * * *